United States Patent
Miyata

(10) Patent No.: US 9,158,492 B2
(45) Date of Patent: Oct. 13, 2015

(54) NON-TRANSITORY COMPUTER-READABLE MEDIUM STORING IMAGE PROCESSING PROGRAM FOR N-IN-1 PRINTING, IMAGE PROCESSING APPARATUS, AND IMAGE PROCESSING METHOD FOR N-IN-1 PRINTING

(71) Applicant: BROTHER KOGYO KABUSHIKI KAISHA, Nagoya-shi, Aichi-ken (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/089,917

(22) Filed: Nov. 26, 2013

(65) Prior Publication Data
US 2014/0146330 A1     May 29, 2014

(30) Foreign Application Priority Data

Nov. 28, 2012  (JP) .................................. 2012-259339

(51) Int. Cl.
  *G06F 3/12*    (2006.01)
  *G06F 3/0484*  (2013.01)
  *G06F 3/0488*  (2013.01)
  *H04N 1/00*    (2006.01)

(52) U.S. Cl.
  CPC .......... *G06F 3/1292* (2013.01); *G06F 3/04845* (2013.01); *G06F 3/04883* (2013.01); *G06F 3/1205* (2013.01); *G06F 3/1256* (2013.01); *G06F 2203/04803* (2013.01); *G06F 2203/04806* (2013.01); *G06F 2203/04808* (2013.01); *H04N 1/00233* (2013.01)

(58) Field of Classification Search
  CPC ... G06F 3/1256; G06F 3/0488; G06F 17/212; G06F 3/1242; H04N 1/3875; H04N 1/387; H04N 1/3877; G03G 2215/00582
  USPC ......... 358/1.2, 1.9, 3.24, 1.18, 527, 528, 450; 382/294, 298; 715/243, 251, 274, 702
  See application file for complete search history.

(56) References Cited

U.S. PATENT DOCUMENTS

| | | | |
|---|---|---|---|
| 2011/0205171 A1* | 8/2011 | Akiyoshi | 345/173 |
| 2012/0086652 A1* | 4/2012 | Kim et al. | 345/173 |
| 2012/0262747 A1 | 10/2012 | Saito | |
| 2013/0205210 A1* | 8/2013 | Jeon et al. | 715/716 |
| 2013/0222275 A1* | 8/2013 | Byrd et al. | 345/173 |

FOREIGN PATENT DOCUMENTS

JP    2012-085297 A    4/2012

* cited by examiner

*Primary Examiner* — Jamares Q Washington
(74) *Attorney, Agent, or Firm* — Merchant & Gould PC

(57) ABSTRACT

There is provided a non-transitory computer-readable medium storing an image processing program causing a controller to execute: obtaining a plurality of image data; allowing the display section to display at least one print preview image; judging whether two points move away from each other or approach toward each other; and changing the value of N, in a case that it is judged that the two points move away from each other or approach toward each other. In a case that the at least one print preview image has been displayed on the display section and that the value of N is changed, the display section is allowed to display a print preview image in the particular area depending on the value of N changed by the controller.

18 Claims, 15 Drawing Sheets

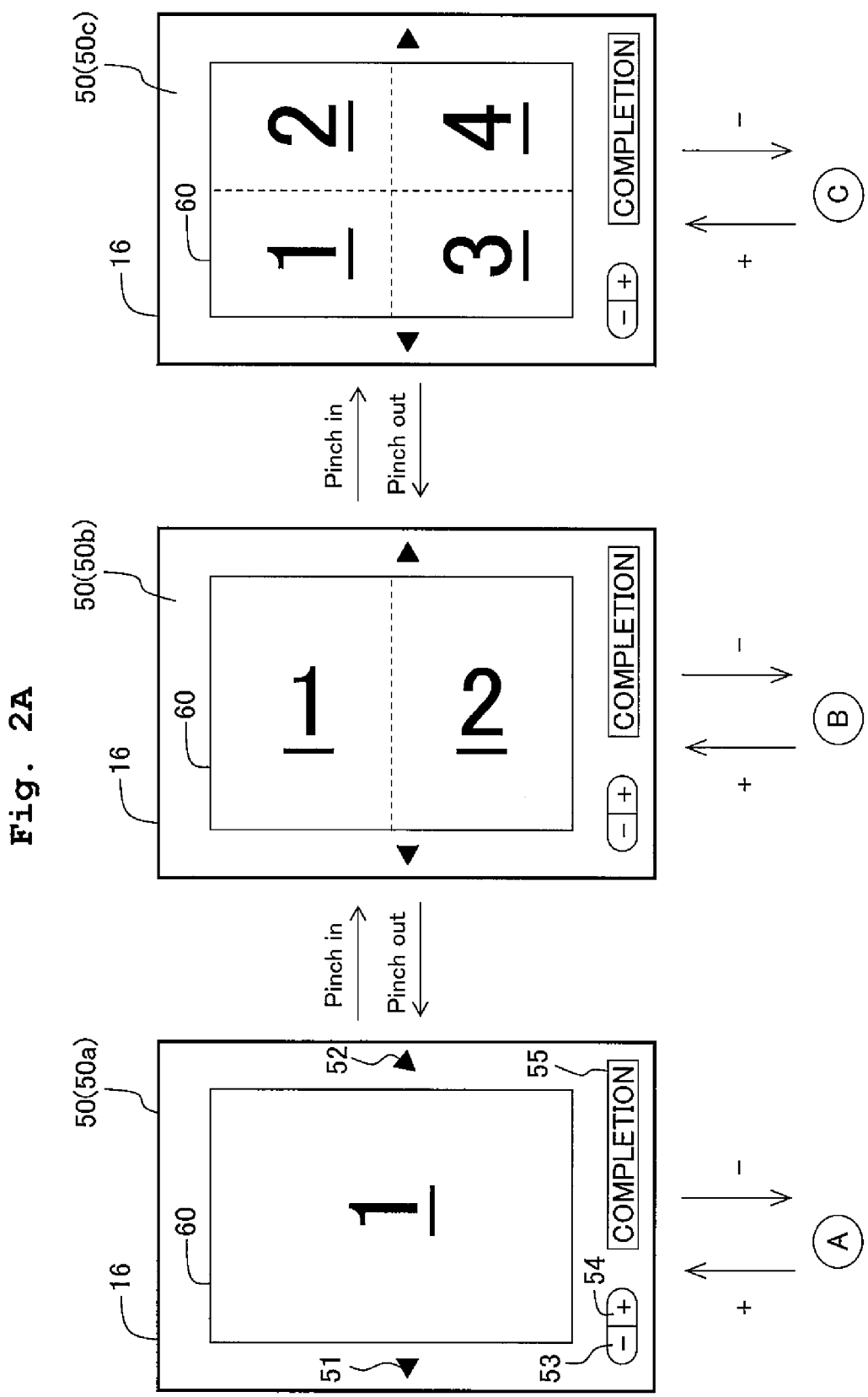

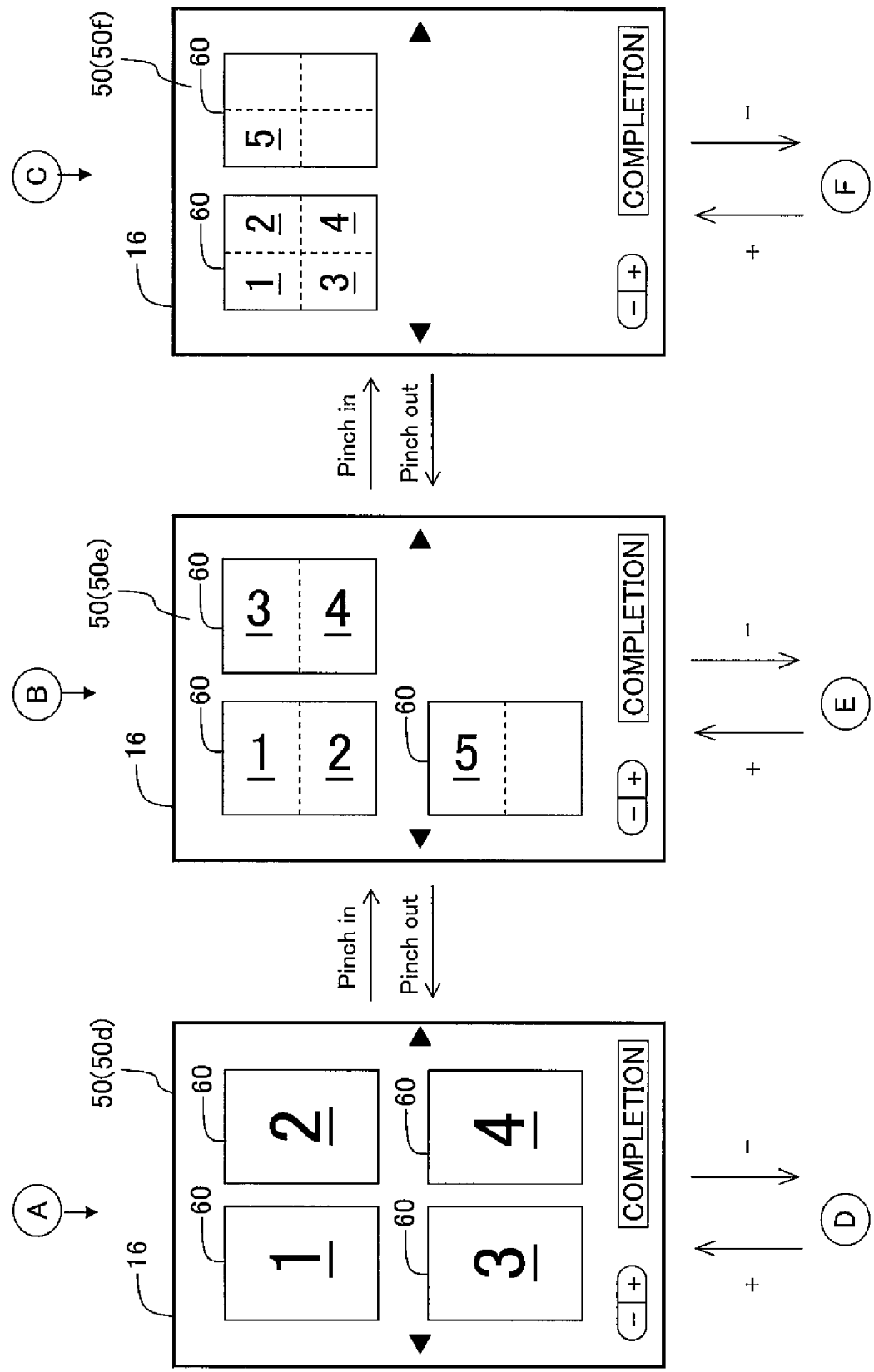

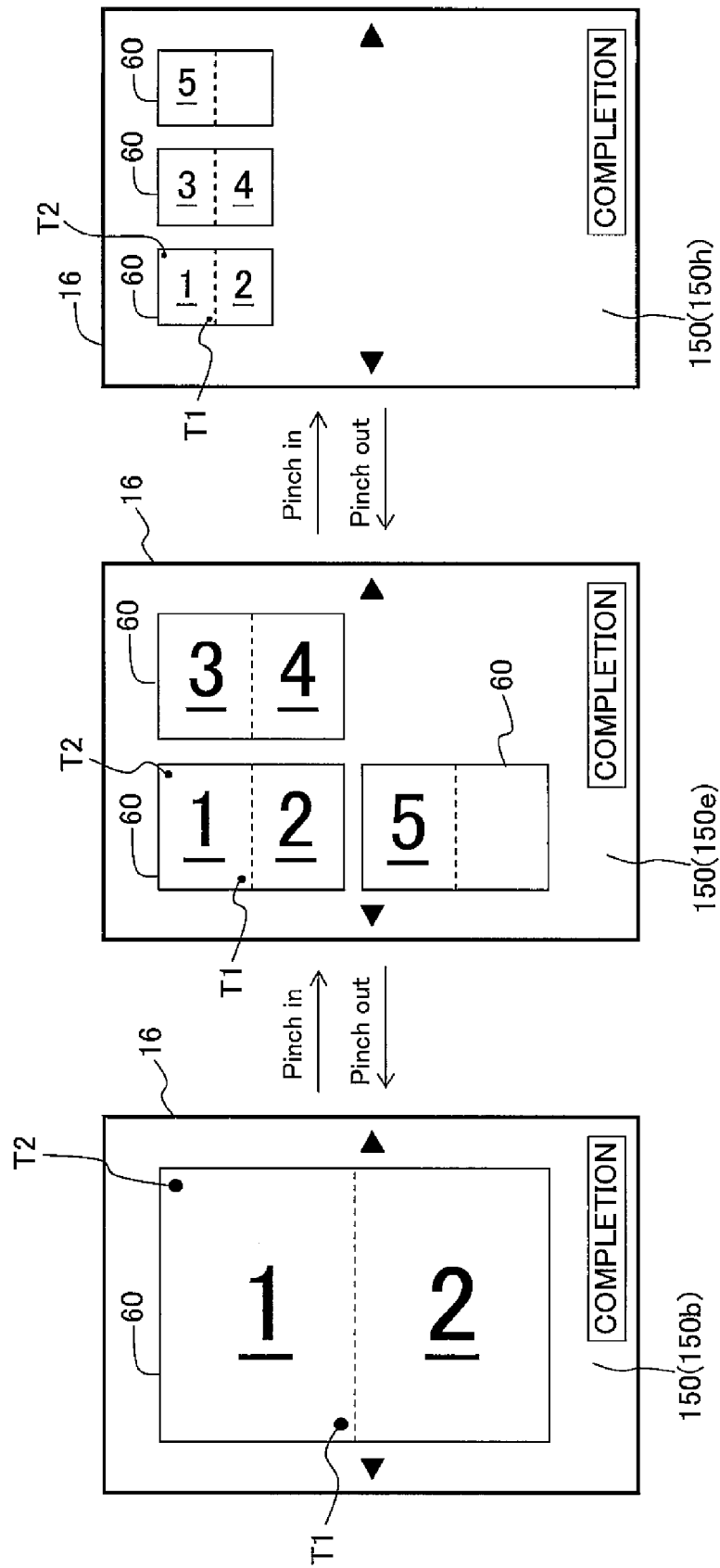

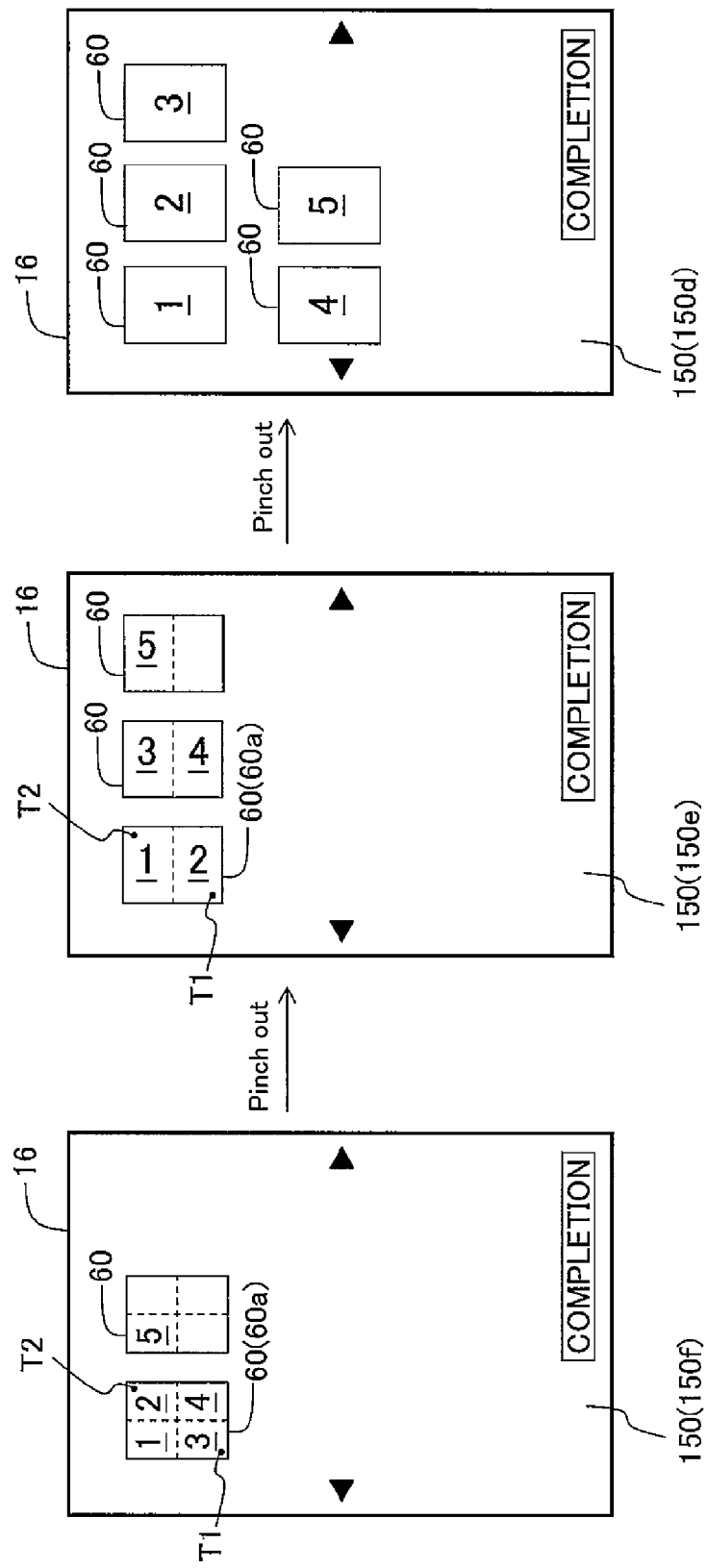

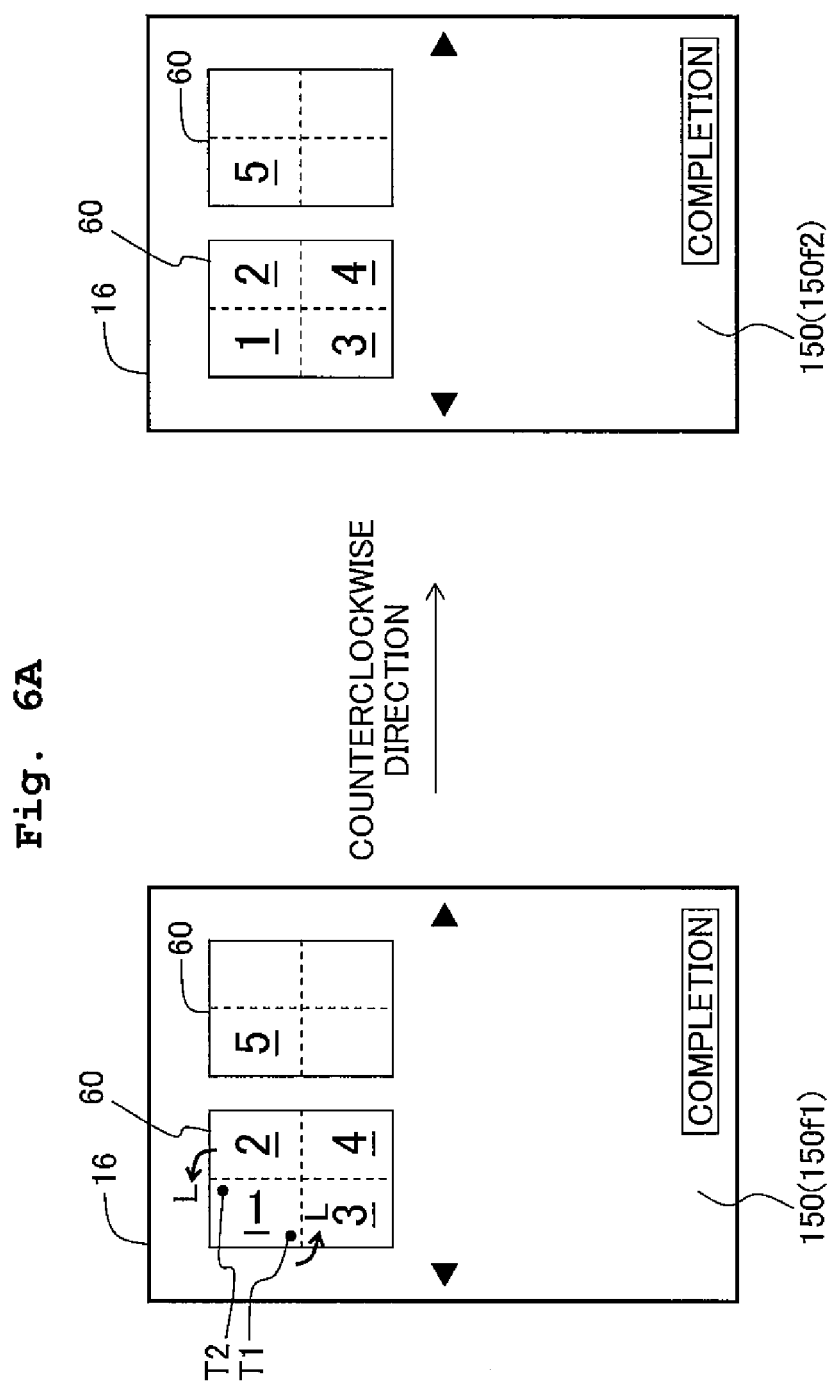

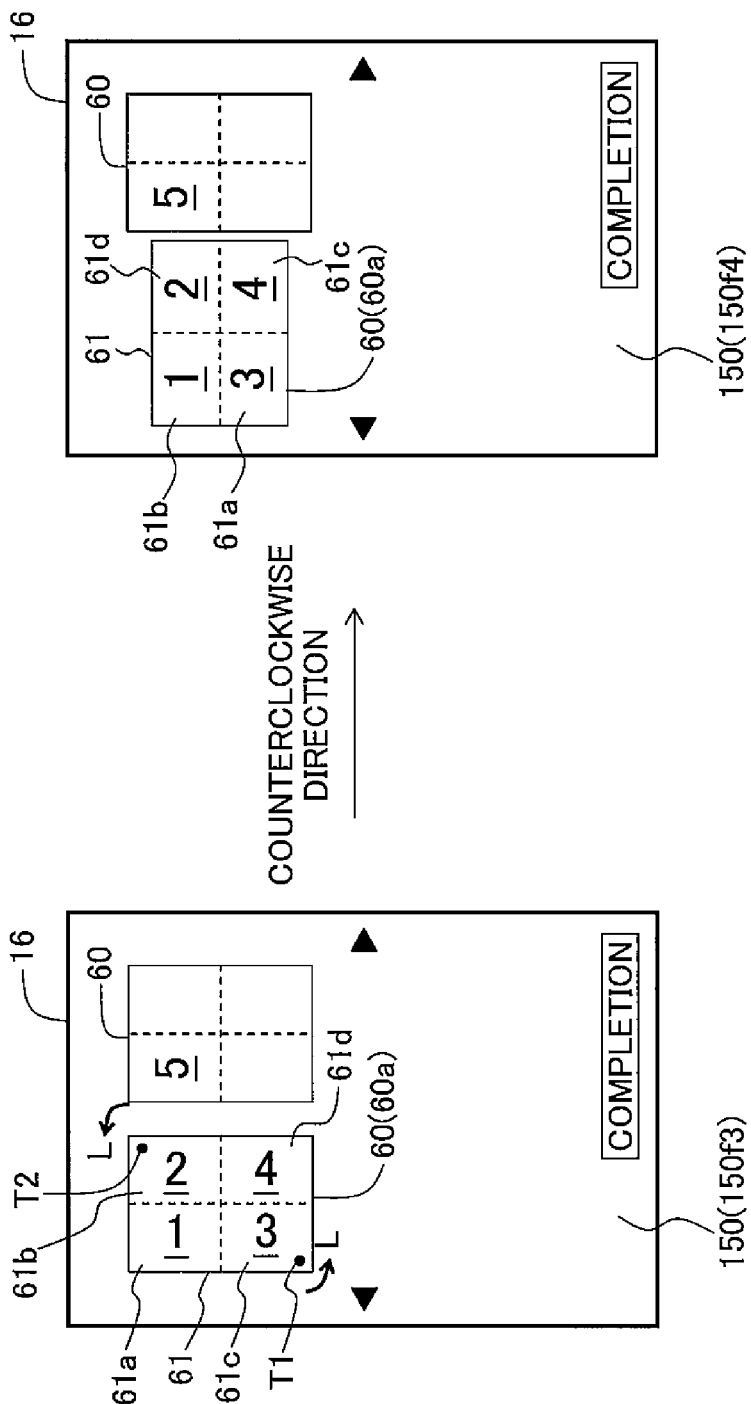

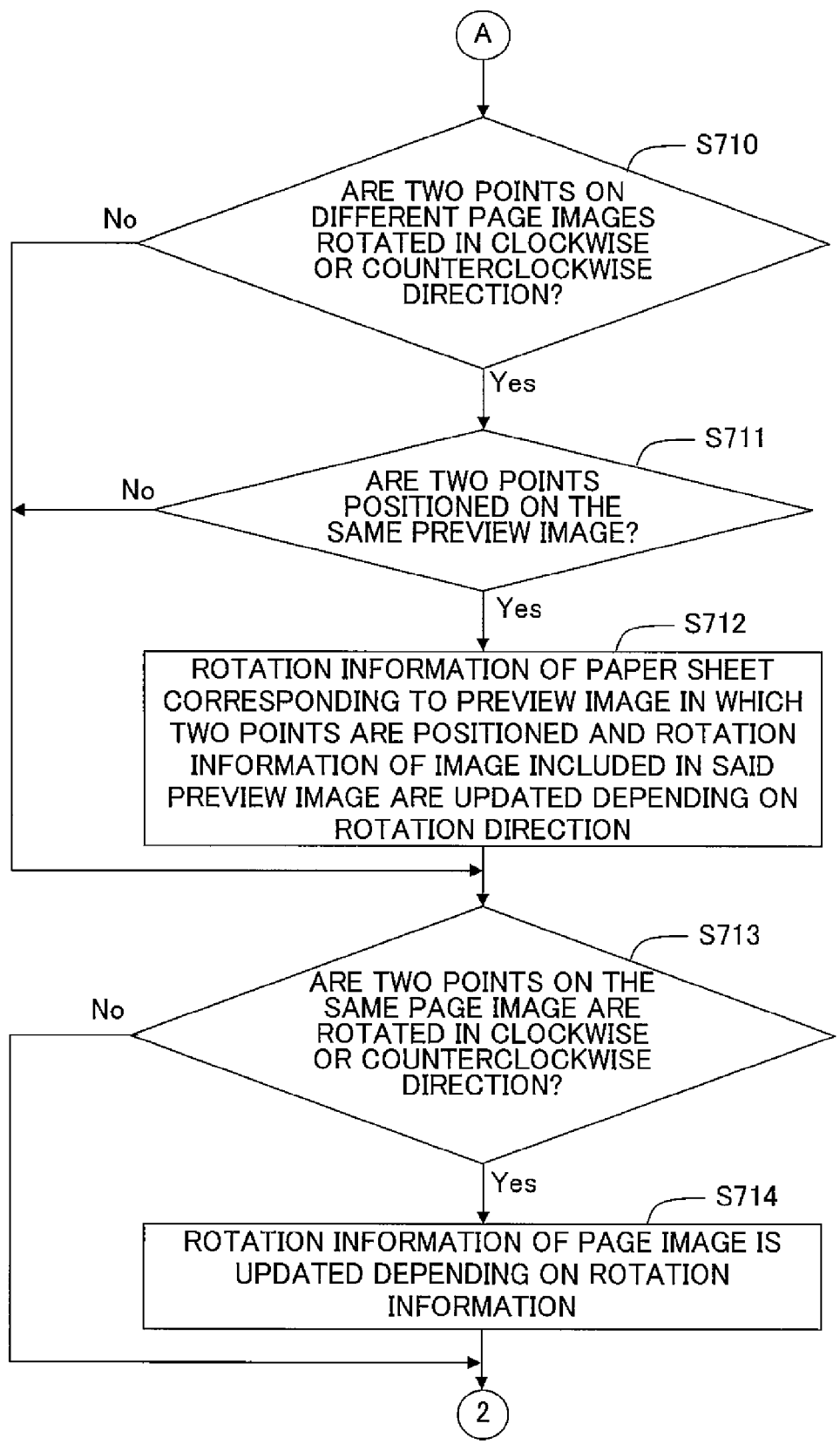

NON-TRANSITORY COMPUTER-READABLE MEDIUM STORING IMAGE PROCESSING PROGRAM FOR N-IN-1 PRINTING, IMAGE PROCESSING APPARATUS, AND IMAGE PROCESSING METHOD FOR N-IN-1 PRINTING

CROSS REFERENCE TO RELATED APPLICATION

The present application claims priority from Japanese Patent Application No. 2012-259339, filed on Nov. 28, 2012, the disclosure of which is incorporated herein by reference in its entirety.

BACKGROUND OF THE INVENTION

1. Field of the Invention

The present invention relates to a non-transitory computer-readable medium storing an image processing program, an image processing apparatus, and an image processing method.

2. Description of the Related Art

Conventionally, there is known a layout printing in which an image of N page(s) (N is an integer of not less than 1) is allotted to one paper sheet to perform printing, i.e., the so-called N-in-1 printing. Conventionally, there is known an image forming apparatus in which setting of an N-in-1 printing, such as the number of pages (N) of the images allotted to one paper sheet, can be changed by performing the following operation by a user. That is, the user touches a predetermined range, on a touch panel, positioned in a print preview image displayed on a preview area, slides the user's finger as it is, and lifts the finger off a predetermined area of the preview area on the touch panel. In particular, there is known that, in a case that a 1-in-1 application area, a 2-in-1 application area, and a 4-in-1 application area have been previously set in the preview area, a value of N in the setting of the N-in-1 printing can be changed to a value corresponding to an area including a position, in the above application areas, at which the operation for lifting the finger off the touch panel is performed.

However, in the image forming apparatus as described above, the setting of the N-in-1 printing is changed by using an application area which has been previously set for each candidate for setting to be changed. Thus, the user needs to know in advance whether each of the candidates is allocated to which one of the application areas, which is inconvenient.

SUMMARY OF THE INVENTION

The present teaching has been made taking the foregoing circumstances into consideration, an object of which is to provide a computer-readable medium storing an image processing program, an image processing apparatus, and an image processing method which are capable of improving the convenience for changing setting of a layout-printing based on a print preview image displayed on a display section.

According to an aspect of the present teaching, there is provided a non-transitory computer-readable medium storing an image processing program executable by a controller of an image processing apparatus configured to be communicatable with a display section on which a touch panel is overlaid, the touch panel being configured to simultaneously detect approach or contact of two points by two input media, the image processing program being configured to cause the controller to execute:

obtaining a plurality of image data;

allowing the display section to display at least one print preview image in which at least one image of not more than N among a plurality of images based on the plurality of the obtained image data is arranged in a particular area corresponding to a print area depending on a value of N, wherein N is an integer of not less than 1;

judging whether or not two points of which approach or contact is detected by the touch panel move away from each other or approach toward each other in a state that the at least one print preview image is displayed on the display section; and changing the value of N which has been set in the at least one print preview image currently displayed on the display section, in a case that it is judged that the two points move away from each other or approach toward each other, wherein, in a case that the at least one print preview image has been displayed on the display section and that the value of N is changed, the display section is allowed to display a print preview image, instead of the at least one print preview image currently displayed on the display section, the print preview image being obtained by arranging at least one image of not more than the value of N changed by the controller, among the plurality of images based on the plurality of the obtained image data, in the particular area depending on the value of N changed by the controller.

Note that the present teaching can be configured as various aspects such as an image processing apparatus, a controller controlling the image processing apparatus, an image processing system, an image processing method, and a recording medium storing an image processing program.

According to the image processing program stored in the recording medium of the present teaching, in a case that it is judged that two points detected by the touch panel move away from each other or approach toward each other, in a state that at least one print preview image including the plurality of images based on the plurality of image data obtained is displayed on the display section, a value of N, which corresponds to a maximum number of images (N) arranged in one print area and has been set in the at least one print preview image currently displayed on the display section, is changed. Then, a print preview image depending on the value of N changed is displayed on the display section. Accordingly, since the print preview image, in which the value of N is changed variously, can be displayed by an easy operation, the user is capable of readily determining the value of N which corresponds to the user's demand while confirming the print preview image. Therefore, the convenience for changing the setting of the layout printing is superior.

BRIEF DESCRIPTION OF THE DRAWINGS

FIGS. 2A to 2C show a view explaining an outline of a first embodiment.

FIG. 4 shows a view explaining an operation for changing the display size of a preview image 60 in a preview screen 150.

FIGS. 5A and 5B show views each explaining an operation for changing the layout (N-in-1) of the image(s) of each preview image 60 in the preview screen 150.

FIG. 6A is a view explaining an operation for changing the orientation of the image included in the preview image 60 in the preview screen 150; and FIG. 6B is a view explaining for changing the orientation of the preview image 60 in the preview screen 150.

FIG. 8A and 8B are another flowcharts showing the main process of the second embodiment.

DESCRIPTION OF THE PREFERRED EMBODIMENTS

Figure 1:
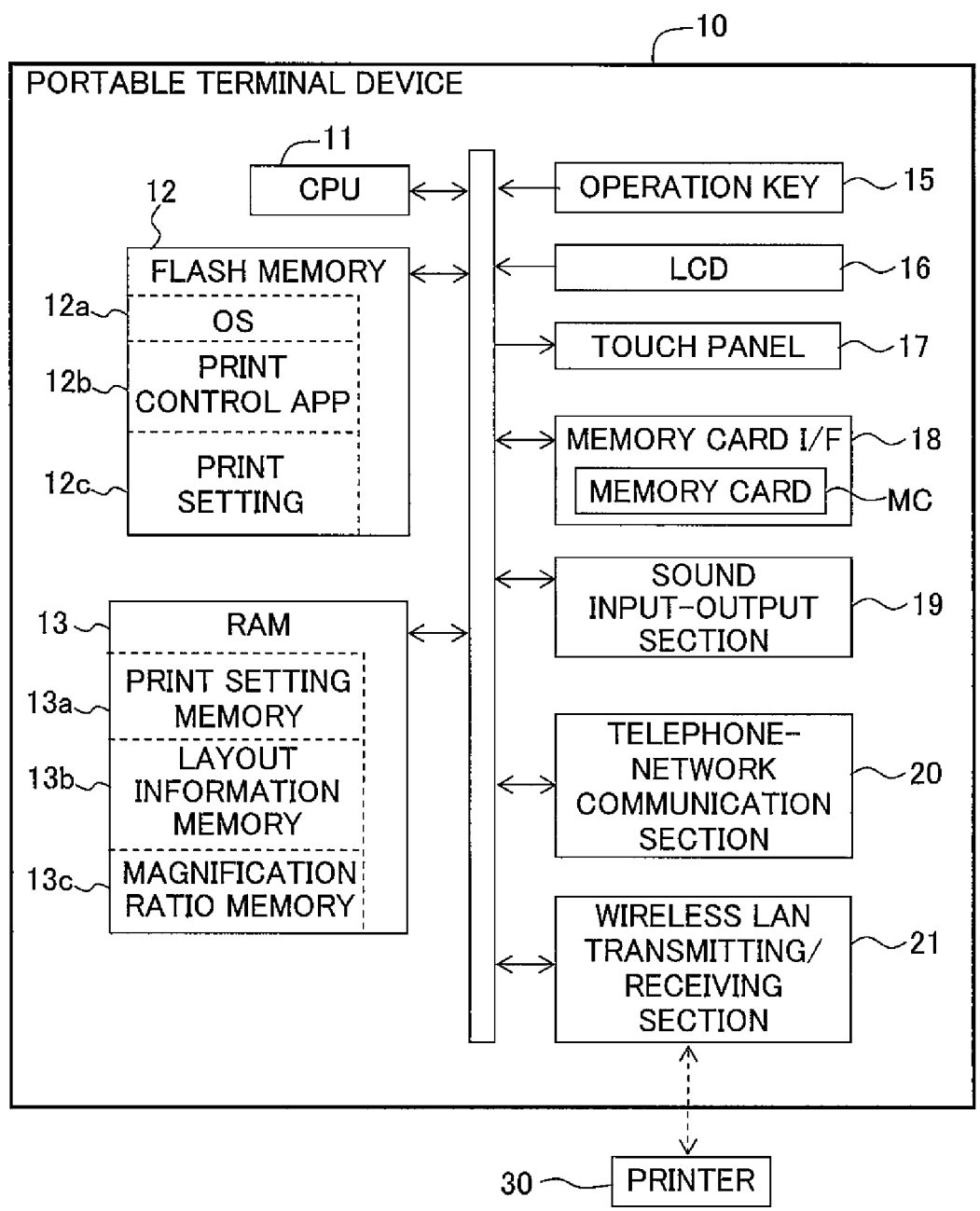
FIG. 1 is a block diagram showing a structure of a portable terminal.

Preferred embodiments of the present teaching will be described below while referring to the accompanying drawings. To start with, the first embodiment of the present teaching will be described below while referring to FIG. 1 to FIG. 3B. FIG. 1 is a block diagram showing the structure of a portable terminal 10 installing a print control application (hereinafter referred to as "print control app") 12b as an image processing program of the present teaching. The print control app 12b of this embodiment is configured as a program via which a user is capable of changing printing layout by an easy and intuitive operation while confirming a print preview image (hereinafter referred to simply as "preview image") displayed on a preview screen. Noted that the term "layout" means arranging an image of N page(s) (N is an integer of not less than 1) with respect to one print paper, i.e., the so-called "N-in-1".

The portable terminal 10 includes a CPU 11, a flash memory 12, a RAM 13, an operation key 15, a liquid crystal display 16 (referred to as an LCD 16), a touch panel 17, a memory card interface 18 (referred to as a memory card I/F 18), a sound input-output section 19, a telephone-network communication section 20, and a wireless LAN transmitting/receiving section 21. These components or sections are connected to one another via a bus line 22. The CPU 11 controls each of the components or sections connected to the bus line 22 in accordance with information of fixed setting values and/or a program, etc., stored in the flash memory 12 and the like. The flash memory 12 is a rewritable, non/volatile memory. The flash memory 12 stores an operating system 12a (hereinafter referred to as OS 12a), the print control app 12b, and a print setting 12c. In the following, the CPU 11 executing a program such as the application and the operation system is described simply as the name of program in some cases. For example, the term "application" means the "CPU 11 executing the application" in some cases. The OS 12a is the basic software realizing the standard function of the portable terminal 10. In this embodiment, the OS 12a is the Android (trade name) OS. Note that the Android (trade name) OS is merely an example of the OS 12a, and any OS may be adopted as the OS 12a, as necessary.

The print control app 12b is an application provided by a vendor of a device such as a printer and a multifunction machine having a printing function, which is to be installed in the portable terminal 10 by the user, and which enables the use of the device from the portable terminal 10. The print control app 12b can be provided in various ways. For example, the print control app 12b can be stored in a server computer (not shown) and the print control app 12b can be downloaded via the server computer by the portable terminal 10. For instance, the print control app 12b enables printing by a printer 30 directly from the portable terminal 10 without going through a personal computer etc. The print control app 12b is configured so that the user can change a maximum number of images which can be laid out in one print paper, that is, the value of N in the N-in-1 layout, depending on a pinching-operation performed by the user while confirming the preview image displayed on the preview screen. The "pinching-operation" is an operation in which two points detected by the touch panel 17 at the same time are allowed to move away from each other or approach closely to each other. For example, in the pinching-operation, the user's two fingers and the like (hereinafter, referred to as "the user's two fingers", so as to simplify the explanation) are detected by the touch panel 17 at the same time, and then the two fingers are allowed to move away from each other or approach closely to each other by the user. The pinching-operation includes a pinch-out operation and a pinch-in operation. In the following description, the operation in which two points are allowed to move away from each other is called as the "pinch-out operation" and the operation in which two points are allowed to approach closely to each other is called as the "pinch-in operation". The print setting 12c is various kinds of settings for the printing and includes, for example, the size, such as A4 and letter, of the print paper (recording paper) used for the printing. The print setting 12c can be changed based on a predetermined operation by the user.

The RAM 13 is a rewritable, volatile memory. The RAM 13 is provided with a print setting memory 13a, a layout information memory 13b, and a magnification-ratio memory 13c. With start-up of the print control app 12b, the content of the print setting 12c is stored in the print setting memory 13a. Layout information is stored in the layout information memory 13b. The "layout information" is a value for defining the N-in-1 and is one of the settings for the printing. In this embodiment, the value which can be set as the layout information includes three types of values of 1-in-1, 2-in-1, and 4-in-1. That is, the value of N in the N-in-1 is defined depending on the value of the layout information, and in this embodiment, 1, 2, or 4 can be used as the value of N. A magnification-ratio is stored in the magnification-ratio memory 13c. The "magnification-ratio" is a value for defining a display size of the preview image displayed on the preview screen. The display size of the preview image increases as the magnification-ratio increases, and the display size of the preview image decreases as the magnification-ratio decreases.

The operation key 15 is a mechanical key for inputting an instruction etc., to the portable terminal 10, and is provided, for example, in the casing of the portable terminal 10. The LCD 16 is a liquid crystal display showing various screens. The touch panel 17 is provided to be overlaid on the LCD 16, and the instruction etc., is inputted to the portable terminal 10 by bringing an indicator such as a finger and a bar into contact with the touch panel 17 or bringing the indicator close to the touch panel 17. The memory card I/F 18 is an interface to which a rewritable, non-volatile memory card MC is installed, and controls data writing or data reading with respect to the memory card MC. The sound input-output section 19 is a device for inputting and outputting sound which includes a microphone, a speaker, and the like. The telephone-network communication section 20 is a circuit for carrying out conversation over telephone via a portable-telephone network (not shown). The wireless LAN transmitting/receiving section 21 connects the portable terminal 10 and various kinds of devices such as the printer 30 by a wireless LAN in conformity to the standard of IEEE 802.11b/g via an access point (not shown) as the relay device, so that the portable terminal 10 and the various devices can communicate with each other. It is possible to use, for example, Wi-Fi (trade name) connection.

Figure 2C:
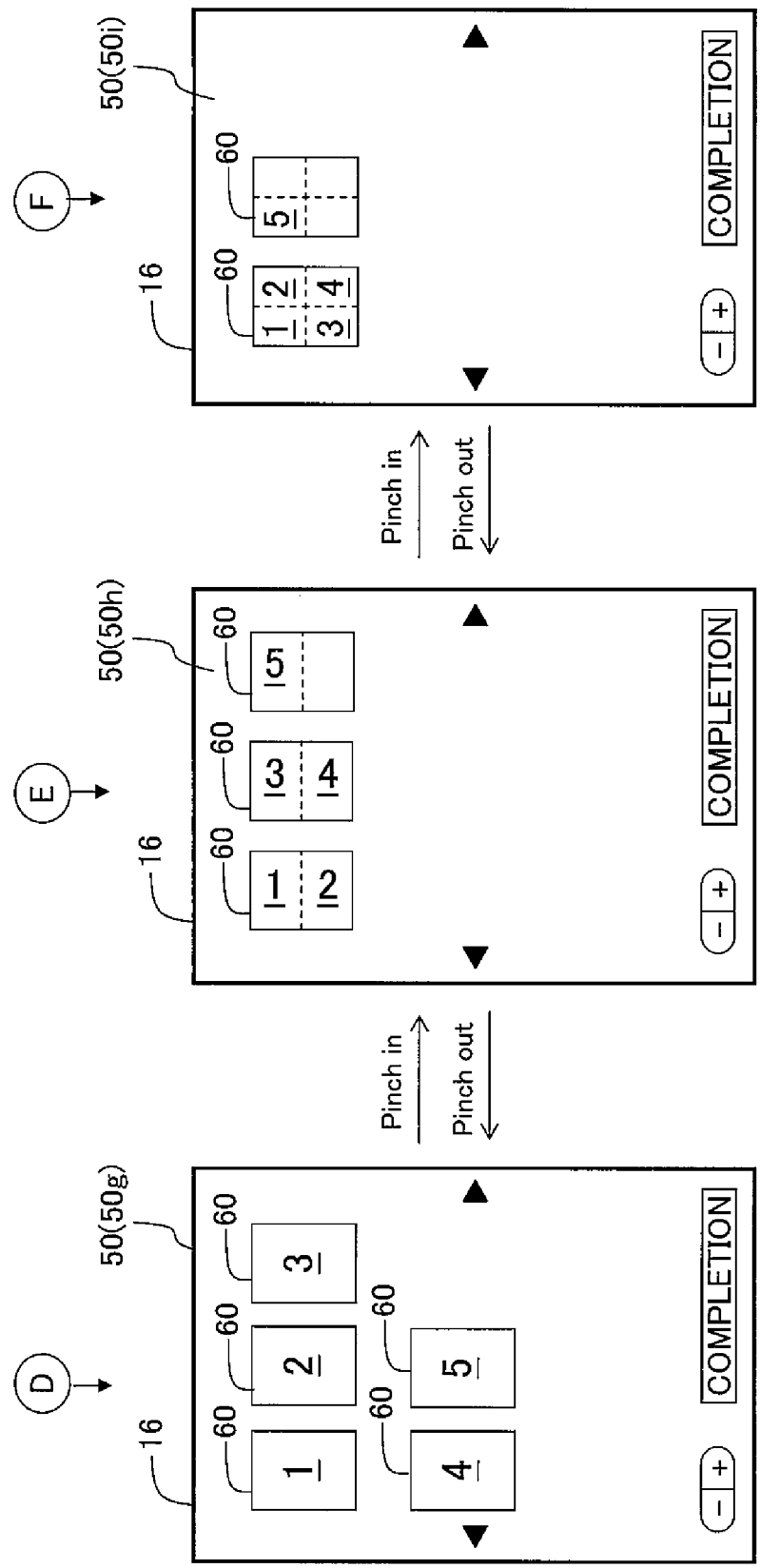

FIGS. 2A to 2C show a view explaining an operation for changing the image layout of each preview image 60 in a preview screen 50. The preview screen 50 is a screen displayed in a case that the user selects to-be printed image(s)

and that the print control app 12b is started or activated. In the preview screen 50, one or more preview images 60 are displayed. Each of the preview images 60 is an image expressing a print result based on each of the images selected by the user. A certain number of images, of the images selected by the user, depending on layout information stored in the layout information memory 13b is/are configured as image(s) arranged in a paper object as a rectangular area corresponding to the print paper. In FIGS. 2A to 2C and FIGS. 4 to 6B which will be described later, each numeral described in each of the preview images 60 shows a page number allotted to each image selected by the user, each side on which an underscore is added is defined as the lower side of the image.

The configuration of the preview screen 50 will be explained by representatively exemplifying a preview screen 50a. In the preview screen 50, a page-back button 51, a page-advance button 52, a minus button 53, a plus button 54, and a completion button 55 are displayed. The page-back button 51 is a button for inputting an instruction to display the preview image of the previous page of the preview image 60 currently displayed on the preview screen 50. The page-advance button 52 is a button for inputting an instruction to display the preview image of the subsequent page of the preview image 60 currently displayed on the preview screen 50. The completion button 55 is an area for inputting an instruction to complete the change in the setting.

The minus button 53 is an area for inputting an instruction to reduce the display size of the preview image 60 displayed on the preview screen 50. Every time the minus button 53 is operated, the display size of the preview image 60 is reduced sequentially. Then, the number of preview images 60 which can be displayed on the preview screen 50 increases. On the other hand, the plus button 54 is an area for inputting an instruction to magnify the display size of the preview image 60 displayed on the preview screen 50. Every time the plus button 54 is operated, the display size of the preview image 60 is magnified sequentially. Then, the number of preview images 60 which can be displayed on the preview screen 50 decreases. Thus, by operating the minus button 53 or the plus button 54 by the user as needed, the preview image(s) 60 according to a desired display size or a desired number of images can be displayed on the preview screen 50.

The reduction and magnification of the preview image 60 based on the operation using the minus button 53 and the plus button 54 are performed while the image layout in the preview image 60 is maintained. Thus, for example, in a case that a 1-in-1 preview image 60 is displayed, the display size of the preview image 60 is sequentially reduced in the order of a layout screen 50a, a layout screen 50d, and a layout screen 50g as shown in FIGS. 2A to 2C, every time the minus button 53 is operated. Similarly, in a case that a 2-in-1 preview image 60 is displayed (a layout screen 50b, a layout screen 50e, and a layout screen 50h) and that a 4-in-1 preview image 60 is displayed (a layout screen 50c, a layout screen 50f, and a layout screen 50i), the display size of the preview image 60 is reduced sequentially every time the minus button 53 is operated in a similar manner as the 1-in-1 preview image 60. On the other hand, in a case that the user operates the plus button 54 in each of the layout screens 50 showing the preview image 60 having one of the layouts (1-in-1, 2-in-1, and 4-in-1), the display size of the preview image 60 increases in an order which is reverse to the case in which the minus button 53 is operated.

According to the print control app 12b of this embodiment, in a case that the pinching-operation is performed on the preview screen 50 by the user, instead of the preview image 60 currently displayed on the preview screen 50, another preview image 60, which corresponds to layout information different from the layout information corresponding to the currently displayed preview image 60, is displayed. That is, when the user performs the pinching-operation on the preview screen 50, the image layout of the preview image 60 is changed. Noted that, although the image layout of the preview image 60 is changed by performing the pinching-operation, the display size of the preview image 60 is not changed.

In particular, in a case that the pinch-in operation is performed by the user, it is displayed a preview image 60 of which value of N in the N-in-1 is larger than that of the currently displayed preview image 60. That is, in the case that the pinch-in operation is performed, the image layout of the preview image 60 can be changed in the order of 1-in-1 (preview screens 50a, 50d, 50g), 2-in-1 (preview screens 50b, 50e, 50h), and 4-in-1 (preview screens 50c, 50f, 50i). On the other hand, in a case that the pinch-out operation is performed by the user, it is displayed a preview image 60 of which value of N in the N-in-1 is smaller than that of the currently displayed preview image 60. That is, in the case that the pinch-out operation is performed, the image layout of the preview image 60 can be changed in the order of 4-in-1 (preview screens 50c, 50f, 50i), 2-in-1 (preview screens 50b, 50e, 50h), and 1-in-1 (preview screens 50a, 50d, 50g).

In this embodiment, the value of N is changed by an amount of change depending on an amount of operation in one pinching-operation (pinch-out operation, pinch-in operation). Specifically, the value of N in the N-in-1 can be changed to a greater value, as the operation amount in the pinch-in operation, i.e. a displacement amount of two points approaching closely to each other by the pinch-in operation, increases. On the other hand, the value of N in the N-in-1 can be changed to a smaller value, as the operation amount in the pinch-out operation, i.e. a displacement amount of two points moving away from each other by the pinch-out operation, increases.

As described above, according to the print control app 12b of this embodiment, the value of N can be changed to be smaller when the pinch-out operation is performed; and the value of N can be changed to be greater when the pinch-in operation is performed. Further, the amount of change in the value of N can be changed depending on the operation amount in the pinching-operation. Therefore, the value of N can be changed intuitively.

Figure 3A:
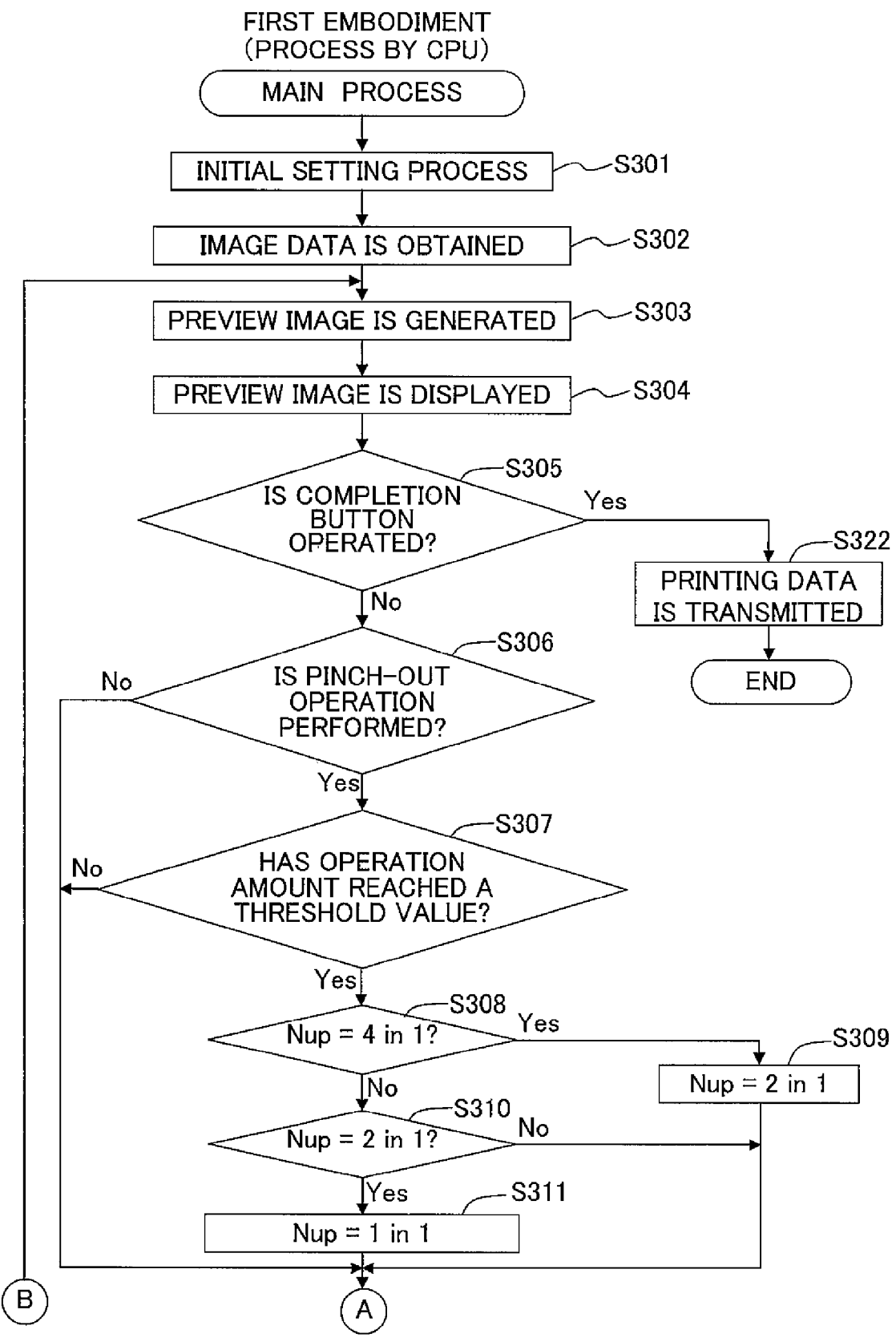
FIGS. 3A and 3B show a flowchart showing a main process.
Figure 3B:
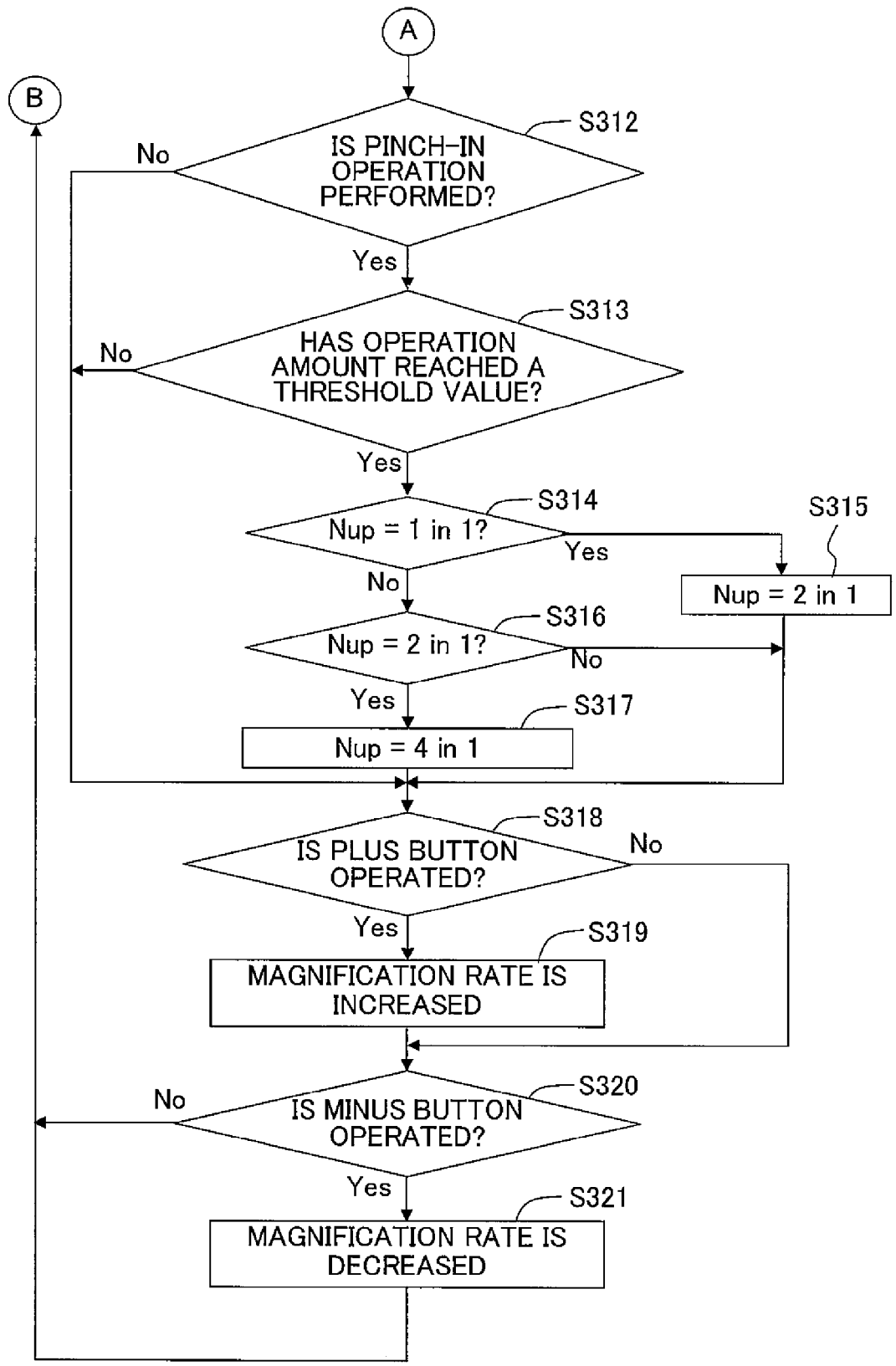

FIGS. 3A and 3B show a flowchart showing a main process executed by the CPU 11 according to the print control app 12b. The process is started when selection of a to-be printed image is determined by the user. The image based on image data stored in various kinds of storage mediums such as the memory card MC and the flash memory 12 can be utilized as the to-be printed image in the present teaching. With the start of this processing, the CPU 11 executes an initial setting process (step S301, hereinafter referred to as S301 simply). In particular, the CPU 11 stores the print setting 12c in the print setting memory 13a and stores "1-in-1" in the layout information memory 13b as an initial value of the layout information. Further, the CPU 11 stores an initial value of the magnification-ratio in the magnification-ratio memory 13c. In a case that the main process was performed in the past, the following is also allowed. That is, the values, which have been stored in the layout information memory 13b and the magnification-ratio memory 13c, are stored in the flash memory 12b etc., at the time of completing the past main process. Then, each of the values stored in the past main process is used as the initial value in S301. Next, the CPU 11 obtains image data corresponding to the selected image (S302). The CPU 11 performs a layout process based on the magnification-ratio stored in the magnification-ratio memory 13c, the value of the layout information stored in the layout information memory 13b, and the size of the print paper stored in the print setting memory 13a as the print setting, to generate the preview image 60 from the obtained image data (S303). The CPU 11 displays the generated preview image 60 on the preview screen 50 (S304).

In a case that the CPU 11 judges that the pinch-out operation is performed instead of the operation of the completion button 55 (S305: No, S306: Yes), the CPU 11 judges whether or not the operation amount of the pinch-out operation has reached a predetermined threshold value (S307). The threshold value as a judgment standard in S307 is provided to have a plurality of levels, and each of the threshold values belonging to one of the levels is provided for each operation amount having a predetermined space in one pinch-out operation. For example, each of the threshold values is provided for each 1 cm operation amount. The CPU 11 judges in S307 that the operation amount of the pinch-out operation has reached the predetermined threshold value, every time the operation amount of the pinch-out operation has reached the threshold value of each of the levels after detection of two points by the touch panel 17 at the same time. Noted that, the phase "after detection of two points by the touch panel 17 at the same time" in the present description includes detection of two points within a predetermined time period, and it is not necessarily limited to detection of two points at exactly the same time. In a case that the CPU 11 judges in S307 that the operation amount of the pinch-out operation has reached the predetermined threshold value (S307: Yes) and that the layout information currently stored in the layout information memory 13b is "4-in-1" (S308: Yes), the CPU 11 changes the layout information to "2-in-1" (S309) and the process proceeds to S312. Then, in a case that the CPU 11 executes the process of S304 subsequently, for example, the display of the preview screen 50c in FIGS. 2A to 2C is changed to the display of the preview screen 50b. Meanwhile, in a case that the current layout information is "2-in-1" (S308: No, S310: Yes), the CPU 11 changes the layout information to "1-in-1" (S311). Then, in the case that the CPU 11 executes the process of S304 subsequently, for example, the display of the preview screen 50b in FIGS. 2A to 2C is changed to the display of the preview screen 50a. In a case that the CPU 11 judges that the current layout information is not "2-in-1" but "1-in-1" which is a minimum value of the value of N (S310: No), the process proceeds to S312 by the CPU 11.

In a case that the pinch-out operation is not performed (S306: No) or that the operation amount of the pinch-out operation does not reach the predetermined threshold value although the pinch-out operation is performed (S307: No), the CPU 11 judges whether or not the pinch-in operation is performed (S312). In a case that the CPU 11 judges in S312 that the pinch-in operation is performed (S312: Yes), the CPU 11 judges whether or not the operation amount of the pinch-in operation has reached the predetermined threshold value (S313). Similar to the case of S307, the CPU judges in S313 that the operation amount of the pinch-in operation has reached the predetermined threshold value every time the operation amount of the pinch-in operation has reached the threshold value of each of the levels after detection of two points by the touch panel 17 at the same time. In a case that the CPU judges in S313 that the operation amount of the pinch-in operation has reached the predetermined threshold value (S313: Yes) and that the layout information currently stored in the layout information memory 13b is "1-in-1" (S314: Yes), the layout information is changed to "2-in-1" (S315) and the process proceeds to S318 by the CPU 11. Then, in the case that the CPU 11 executes the process of S304 subsequently, for example, the display of the preview screen 50a in FIGS. 2A to 2C is changed to the display of the preview screen 50b. In a case that the current layout information is "2-in-1" (S314: No, S316: Yes), the layout information is changed to "4-in-1" by the CPU 11 (S317). Then, in the case that the CPU 11 executes the process of S304 subsequently, for example, the display of the preview screen 50b in FIGS. 2A to 2C is changed to the display of the preview screen 50c. In a case that the current layout information is not "2-in-1" but "4-in-1" which is a maximum value of the value of N (S316: No), the process proceeds to S318 by the CPU 11.

In a case that the pinch-in operation is not performed (S312: No) or that the operation amount of the pinch-in operation does not reach the predetermined threshold value although the pinch-in operation is performed (S313: No), the CPU 11 judges whether or not the plus button 54 is operated (S318). In a case that the CPU 11 judges in S318 that the plus button 54 is operated (S318: Yes), the CPU 11 increases the current magnification-ratio stored in the magnification-ratio memory 13c by a predetermined amount (S319). Then, in the case that the CPU 11 executes the process of S304 subsequently, for example, the display of the preview screen 50d in FIGS. 2A to 2C is changed to the display of the preview screen 50a. Meanwhile, in a case that the CPU 11 judges that the minus button 53 is operated instead of the plus button 54 (S318: No, S320: Yes), the CPU decreases the current magnification-ratio stored in the magnification-ratio memory 13c by a predetermined amount (S320) and the process proceeds to S303. In a case that the process of S304 is executed by the CPU 11 after the process of S320, for example, the display of the preview screen 50a in FIGS. 2A to 2C is changed to the display of the preview screen 50d. In a case that neither the minus button 53 nor the plus button 54 is operated (S320: No), the process proceeds to S303 by the CPU 11.

In a case that the CPU 11 judges that the completion button 55 is operated (S305: Yes), the CPU 11 transmits the image data of to-be printed image and the contents of the print setting memory 13a and the layout information memory 13b, as printing data, to the printer 30 (S322), and the CPU 11 completes this process. By performing the process of S322, the printer 30 forms the image selected by the user on the print paper by the image layout (N-in-1) of the preview image 60 displayed on the preview screen 50. Accordingly, the value of N changed in the pinching-operation is reflected at the time of printing. Noted that, it may be configured such that printing data generated from each data transmitted to the printer 30 as the printing data in S322 is transmitted to the printer 30 as the printing data.

Next, the explanation will be made about the second embodiment of the present teaching while referring to FIG. 4 to FIG. 8. In the above first embodiment, the image layout (N-in-1) of the preview image 60 is changed by the pinching-operation and the display size of the preview image 60 is changed by the operation using the minus button 53 or the plus button 54. In the second embodiment, both of N-in-1 and the display size can be changed by the pinching-operation. The constitutive parts or components, which are the same as or equivalent to those of the first embodiment, are designated by the same reference numerals, any explanation of which will be omitted as appropriate.

At first, the outline of the second embodiment of the present teaching will be explained with reference to FIG. 4 to FIG. 6. In this embodiment, the display size of the preview image 60 can be changed by performing the pinching-operation. Therefore, the minus button 53 and the plus button 54 are not displayed on the preview screen 150 of the second embodiment. The preview screen 150 is configured similar to the preview screen 50 of the first embodiment, except that the buttons 53 and 54 are not displayed.

According to the print control app 12*b* of this embodiment, in a case that two points as base points of the pinching-operation, that is, two points detected by the touch panel 17 at the same time, are positioned in one image included in the preview image 60, the display size of the preview image 60 is changed. Thus, in a case that the user touches one image, with the user's two fingers, among images which have been displayed on the preview screen 150 to be included in the preview image 60, to perform the pinching-operation, it is displayed another preview image 60 obtained by magnifying or reducing the preview image 60 currently displayed on the preview screen 150, instead of the currently displayed preview image 60. In particular, in a case that it is performed the pinch-out operation in which two points positioned in one image included in the preview image 60 are used as the base points, the display size of the preview image 60 is increased depending on the operation amount of the pinch-out operation. Meanwhile, in a case that it is performed the pinch-in operation in which two points positioned in one image included in the preview image 60 are used as the base points, the display size of the preview image 60 is reduced depending on the operation amount of the pinch-in operation.

For example, in a state that a preview screen 150 (150*b*) shown on the left side of FIG. 4 is displayed and in a case that the user touches two points T1 and T2 positioned in the image of the first page, with the user's two fingers, among images included in the 2-in-1 preview image 60, to perform the pinch-in operation for allowing the two points T1 and T2 to approach closely to each other, the display size of the preview image 60 is reduced. In this case, the display size of the preview image 60 shown in the preview screen 150*b* can be reduced to the display size shown in a preview screen 150*h* through the display size shown in a preview screen 150*e*, as the operation amount in the pinch-in operation is increased. Meanwhile, in a state that the preview screen 150 (150*h*) shown on the right side of FIG. 4 is displayed and in a case that the user touches two points T1 and T2 positioned in the image of the first page, with the user's two fingers, among images included in the 2-in-1 preview image 60, to perform the pinch-out operation for allowing the two points T1 and T2 to move away from each other, the display size of the preview image 60 is increased. In this case, the display size of the preview image 60 shown in the preview screen 150*h* can be magnified to the display size shown in the preview screen 150*b* through the display size shown in the preview screen 150*e*, as the operation amount in the pinch-out operation is increased.

As described above, according to the print control app 12*b* of this embodiment, the display size of the preview image 60 can be magnified or reduced by performing the pinching-operation in which two points positioned in one image are used as base points. Therefore, the user is capable of changing the display size of the preview image 60 by the easy and intuitive operation.

According to the print control app 12*b* of this embodiment, in a case that two points as base points of the pinching-operation, i.e. two points detected by the touch panel 17 at the same time, are respectively positioned in two images included in the preview image 60, the value of N in the N-in-1 is changed depending on the pinching-operation. Thus, in a case that the user touches two images, with the user's two fingers, among images which have been displayed on the preview screen 150 to be included in the preview image 60, to perform the pinching-operation, it is displayed another preview image 60, which corresponds to layout information different from the layout information corresponding to the preview image 60 currently displayed on the preview screen 150, instead of the currently displayed preview image 60. In particular, in a case that it is performed the pinch-in operation in which two points respectively positioned in two images, which are included in different preview images 60, are used as the base points, it is displayed a preview image 60 having a value of N in the N-in-1 which is one level higher. Meanwhile, in a case that the pinch-out operation in which two points respectively positioned in two images, which are included in the same preview image 60, are used as the base points, it is displayed a preview image 60 having a value of N in the N-in-1 which is one level lower.

Figure 5A:
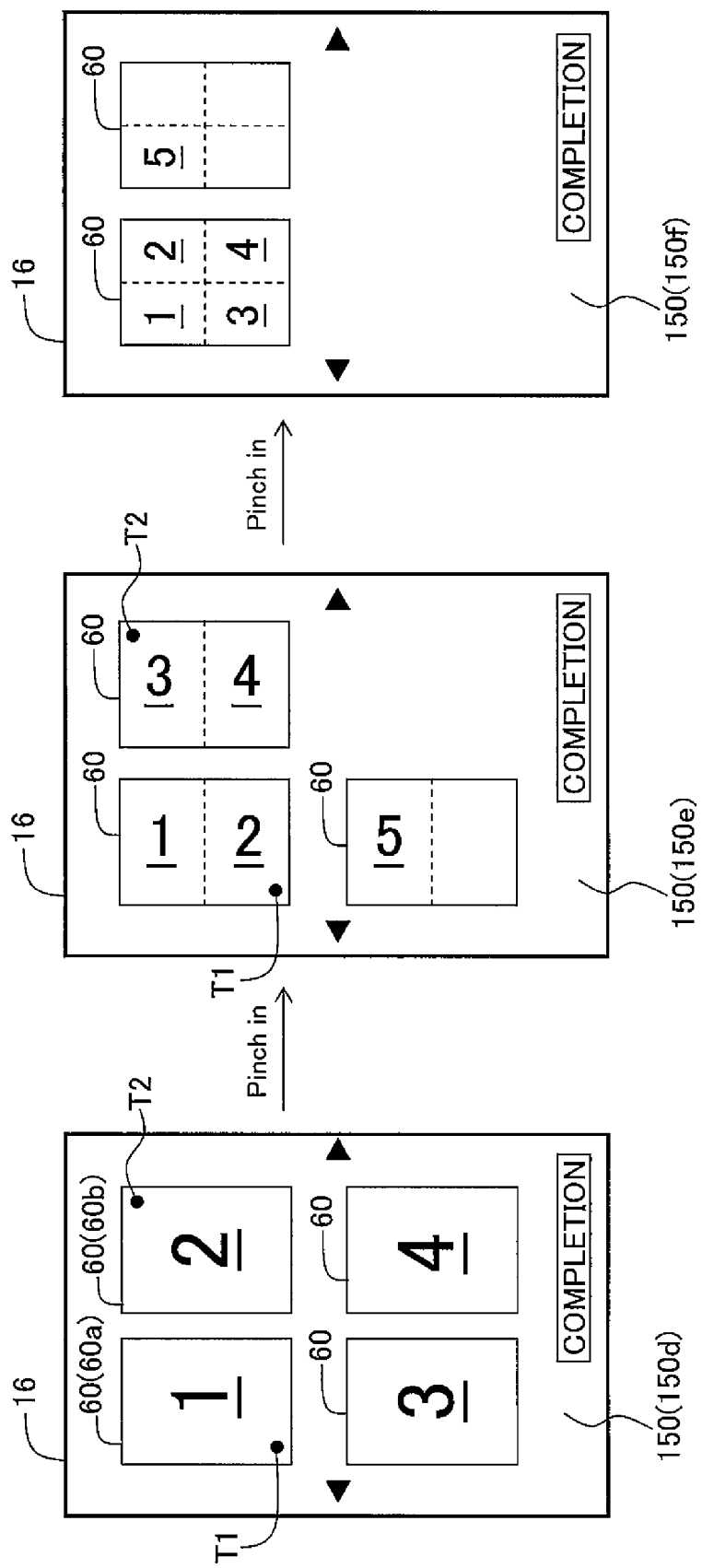

For example, in a state that a preview screen 150 (150*d*) positioned on the left side of FIG. 5A is displayed (i.e. in a state that each preview image 60 of 1-in-1 is displayed) and in a case that the user touches a point T1 positioned in the image of the first page included in the preview image 60 (60*a*) of the first page and a point T2 positioned in the image of the second page included in the preview image 60 (60*b*) of the second page, with the user's two fingers, to perform the pinch-in operation for allowing the two points T1 and T2 to approach closely to each other, the image layout of each preview image 60 is changed to 2-in-1 shown in a preview screen 150 (150*e*) positioned at the center of FIG. 5A. Similarly, in a state that the preview screen 150*e* is displayed and in a case that the user touches a point T1 positioned in the image of the second page included in the preview image 60*a* of the first page and a point T2 positioned in the image of the third page included in the preview image 60*b* of the second page, with the user's two fingers, to perform the pinch-in operation, the image layout of each preview image 60 is changed to 4-in-1 shown in a preview screen 150 (150*f*) positioned on the right side of FIG. 5A.

Meanwhile, in a state that a preview screen 150 (150*f*) positioned on the left side of FIG. 5B is displayed (i.e. in a state that each preview image 60 of 4-in-1 is displayed) and in a case that the user touches a point T1 positioned in the image of the third page included in the preview image 60 (60*a*) of the first page and a point T2 positioned in the image of the second page included in the preview image 60*a* of the first page, with the user's two fingers to perform the pinch-out operation for allowing the two points T1 and T2 to move away from each other, the image layout of each preview image 60 is changed to 2-in-1 shown in a preview screen 150 (150*e*) positioned at the center of FIG. 5B. Similarly, in a state that the preview screen 150*e* is displayed and in a case that the user touches a point T1 positioned in the image of the second page included in the preview image 60*a* of the first page and a point T2 positioned in the image of the first page included in the preview image 60*a* of the first page, with the user's two fingers to perform the pinch-out operation, the image layout of each preview image 60 is changed to 1-in-1 shown in a preview screen 150 (150*d*) positioned on the right side of FIG. 5B.

As described above, according to the print control app 12*b* of this embodiment, in the case that it is performed the pinch-in operation in which two points positioned in respective images of two pages, which are included in different preview images 60, are used as the base points, the value of N is changed. Thus, the value of N can be changed by the intuitive operation such that respective images of the plurality of pages included in different preview images 60 are gathered. In the case that it is performed the pinch-out operation in which two points respectively positioned in two images which are included in the same preview image 60 are used as the base points, the value of N is changed. Thus, the value of N can be changed by the intuitive operation such that respective images of the plurality of pages included in one preview image 60 are separated from each other. The pinching-operation performed when the value of N is changed can use two points, which are positioned in respective images of two pages included in different preview images, as the base points. The pinching-operation performed when the display size of the preview image is changed can use two points, which are positioned in respective images of two pages included in the same preview image, as the base points. In the former case, the value of N is changed, and the latter case, the display size of the preview image 60 is changed. In other words, by just performing the pinching-operation, the value of N or the display size of the preview image 60 can be changed. Accordingly, the user is capable of performing these changes by the intuitive operation.

According to the print control app 12b of this embodiment, in a case that two points positioned in one image included in the preview image 60 are detected by the touch panel 17 at the same time and that the two points are moved in a counterclockwise direction or a clockwise direction, the one image is rotated. Thus, in a case that the user touches one image, with the user's two fingers, among images displayed on the preview screen 150 and included in the preview image 60, to move the fingers in the counterclockwise direction or the clockwise direction, instead of the preview image 60 currently displayed on the preview screen 150 and including the one image, it is displayed a preview image 60 in which the one image is rotated in a direction corresponding to the rotation direction.

For example, in a state that a preview screen 150 (150/1) shown on the left side of FIG. 6A is displayed and in a case that the user touches two points T1 and T2 positioned in the image of the first page, with the user's two fingers, among images included in the 4-in-1 preview image 60, to move the two points T1 and T2 in the counterclockwise direction (direction of the arrow L), the image of the first page is rotated by 90 degrees in the counterclockwise direction. Then, the preview screen 150 positioned on the left side of FIG. 6A is changed to a preview screen 150 (150/2) positioned on the right side of FIG. 6A. Therefore, in a case that the upper part of the image of the first page in the preview screen 150 (150/1) is tilted toward the right side relative to images of other pages, the image of the first page can be arranged to have the up-down direction, which is the same as that of the images of other pages, by performing the rotation operation. Thus, the visibility of each of the layout images can be improved. In a case that one image is rotated by the rotation operation, with the rotation of the one image, the one image is magnified or reduced appropriately so that the rotated one image is fit in an arrangement area in which the one image of N-in-1 layout is arranged.

According to the print control app 12b of this embodiment, in a case that two points respectively positioned in two images included in one preview image 60 are detected by the touch panel 17 at the same time and that the two points are moved in the counterclockwise or clockwise direction, the one preview image 60 is rotated. Thus, in a case that the user touches the two images, which are included in one preview image 60 displayed on the preview screen 150, with the user's fingers to move the fingers in the counterclockwise or clockwise direction, instead of the one preview image 60 currently displayed on the preview screen 150, it is displayed a preview image 60 obtained by rotating the one preview image 60 in a direction corresponding to the rotation direction.

For example, in a state that a preview screen 150 (150/3) shown on the left side of FIG. 6B is displayed and in a case that the user touches a point T1 positioned in the image of the third page included in the preview image 60 (60a) of the first page and a point T2 positioned in the image of the second page included in the preview image 60a of the first page, with the user's two fingers, to move the two points T1 and T2 in the counterclockwise direction (direction of the arrow L), the preview image 60a is rotated by 90 degrees in the counterclockwise direction. In particular, a paper object 61 of the preview image 60a and respective images of the first to fourth pages included in the preview image 60a are rotated by 90 degrees in the counterclockwise direction. Then, the preview screen 150 positioned on the left side of FIG. 6B is changed to a preview screen 150 (150/4) positioned on the right side of FIG. 6B.

The print control app 12b is configured as follows. That is, when the preview image 60 in which images of a plurality of pages are arranged is rotated, the print control app 12b controls the arrangement order of the images of the plurality of pages so as not to change the arrangement order of the images of the plurality of pages arranged in the preview image 60 before and after the rotation. For example, as shown on the left side of FIG. 6B, each of the images of the first to fourth pages arranged in the preview image 60a before the rotation is arranged in one of the arrangement areas 61a to 61d obtained by dividing the portrait-oriented paper object 61 into four parts, so that the image having the smallest page number is arranged in an upper-left arrangement area 61a; the image having the second smallest page number is arranged in an upper-right arrangement area 61b; the image having the third smallest page number is arranged in a lower-left arrangement area 61c; and the image having the largest page number is arranged in a lower-right arrangement area 61d. In a case that the preview image 60a is rotated in the counterclockwise direction by 90 degrees, the positions of the four arrangement areas 61a to 61d are changed to the lower left, the upper left, the lower right, and the upper right in the paper object 61 after the rotation, respectively. Then, in a case that each of the images of the first to fourth pages is arranged in one of the arrangement areas 61a to 61d after the rotation, the image of the first page is arranged in the lower-left arrangement area; the image of the second page is arranged in the upper-left arrangement area; the image of the third page is arranged in the lower-right arrangement area; and the image of the fourth page is arranged in the upper-right arrangement area. This arrangement order is different from the arrangement order before the rotation and also different from the initial or original intent of the user, which is inconvenient. However, the print control app 12b of this embodiment is configured so that the image of each of the pages is arranged in one of the arrangement areas 61a to 61d in the paper object 61 after the rotation in accordance with the arrangement rule which is the same as the arrangement rule before the rotation. That is, in the landscape-oriented paper object 61, the image of the first page is arranged in the upper-left arrangement area 61b; the image of the second page is arranged in the upper-right arrangement area 61d; the image of the third page is arranged in the lower-left arrangement area 61a; and the image of the fourth page is arranged in the lower-right arrangement area 61c. Accordingly, by using the print control app 12b of this embodiment, it is possible to prevent the change of the arrangement order of the images of the plurality of pages before and after the rotation of the preview image 60. Thus, in a case that each of the images arranged in the preview image 60a shown on the left side of FIG. 6B is a horizontally long image, each of the horizontally long images can be laid out in the landscape-oriented paper object 61 in accordance with the same arrangement order as that before the rotation by performing the rotation operation as described above. Accordingly, each of the horizontally long images can be arranged to have a size as large as possible in accordance with the arrangement order desired by the user.

For example, there is known that, in an conventional image forming apparatus, the orientation of each image allotted to one print paper can be changed by performing an operation in which a user touches, with the user's finger, a predetermined range, on a touch panel, positioned in a print preview image displayed on a preview area; slides the finger as it is; and lifts the finger off a predetermined area of the preview area on the touch panel. However, similar to the case in which the setting of N-in-1 printing is changed, the user needs to know in advance whether each of the candidates is allocated to which one of the application areas, which is inconvenient. Further, the setting for the orientation of the print paper has conventionally been performed in a printer setting screen other than the preview screen for displaying the preview image. Therefore, in a case that the user desires to change the orientation of the print paper after the preview image is displayed, it is necessary that the user closes the preview image and then opens the printer setting screen to perform the setting, which is cumbersome. However, according to the print control app 12b of this embodiment, in a case that it is performed the rotation operation by using two points, which are positioned in respective images of two pages included in the same preview image 60, as the base points, the preview image 60 is rotated; and in a case that it is performed the rotation operation by using two points, which are positioned in the image of one page included in the preview image 60, as the base points, the image of the one page is rotated. Thus, by just performing the rotation operation, both of the rotation of the preview image 60 (rotation of the print paper) and the rotation of the image of each page can be performed. Therefore, it is possible to perform the rotation of the preview image 60 and the rotation of the image of each page by the easy and intuitive operation in which two points detected by the touch panel 17 are rotated, and the operability is superior.

It is noted that the positions of the points T1 and T2 shown in FIG. 4, FIG. 5A, FIG. 5B, FIG. 6A, and FIG. 6B are merely examples, and the present teaching is not limited thereto. For example, even when the two points T1 and T2 are positioned in the image of any other page other than the image of the first page, the display size of the preview image 60 can be magnified or reduced depending on the pinching-operation similar to the case shown in FIG. 4. In this case, the preview image 60 may be N-in-1 other than 2-in-1. Further, the value of N can be increased similar to the case shown in FIG. 5A, provided that the points T1 and T2 are positioned in respective images included in different preview images 60, regardless of whether each of the points T1 and T2 is included in which one of the preview images. The value of N can be decreased similar to the case shown in FIG. 5B provided that the two points T1 and T2 are positioned in two images included in the same preview image 60, regardless of whether the points T1 and T2 are included in which one of the preview images.

Further, every image can be rotated similar to the case shown in FIG. 6A provided that the two points T1 and T2 are positioned in one image. Every preview image can be rotated similar to the case shown in FIG. 6B provided that the two points T1 and T2 are respectively positioned in two images included in one preview image 60, regardless of whether each of the two points T1 and T2 is included in which one of the images and which one of the preview images. In a case that the image or the preview image 60 is rotated, even when the preview image 60 displayed on the preview screen 50 is N-in-1 other than 2-in-1, the image or the preview image 60 can be rotated in the same manner. In a case that the two points T1 and T2 are rotated in the clockwise direction, the image including the positions of the two points T1 and T2 is rotated by 90 degrees in the clockwise direction.

Figure 7A:
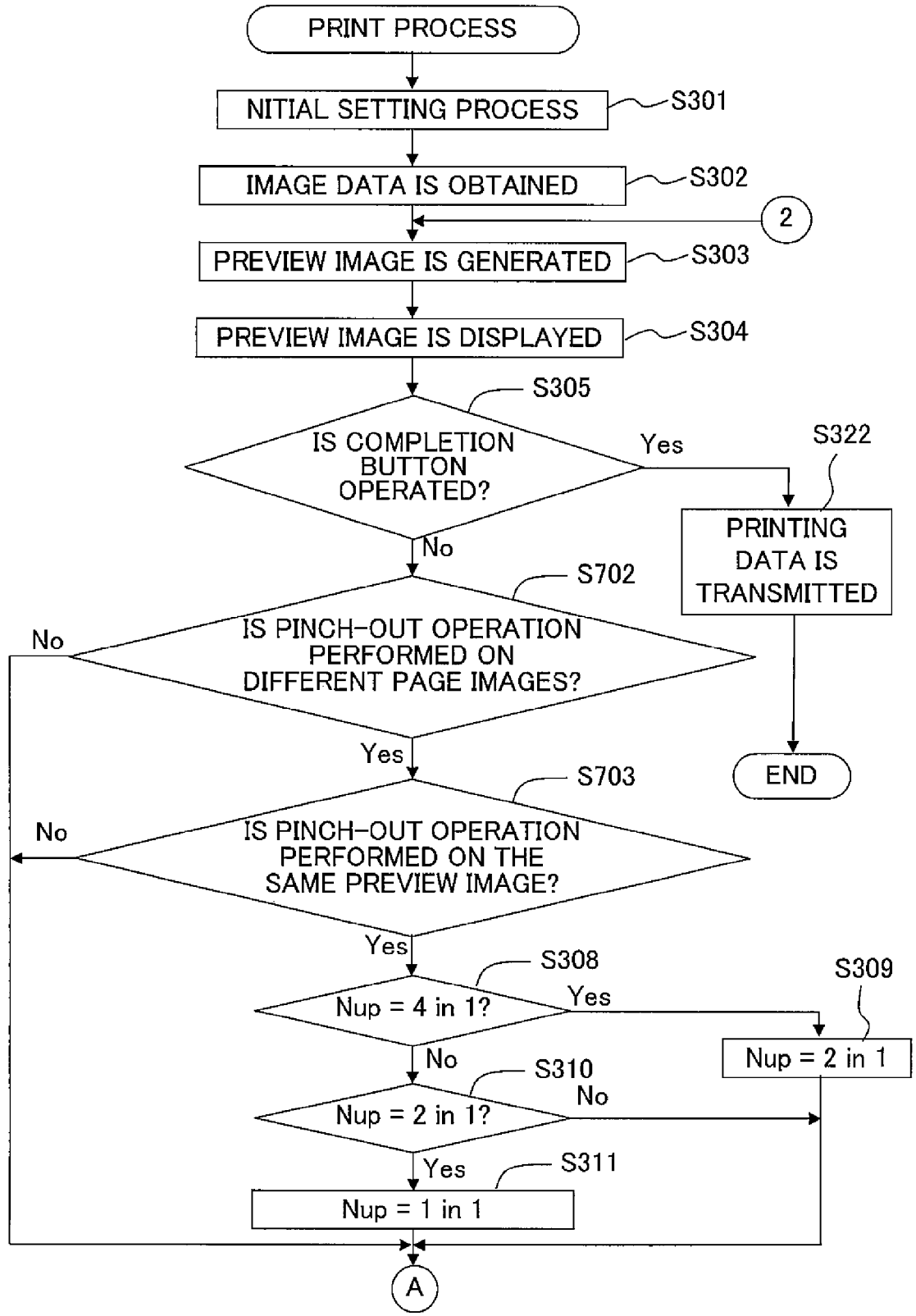
FIGS. 7A and 7B show a flowchart showing a main process of a second embodiment.
Figure 7B:
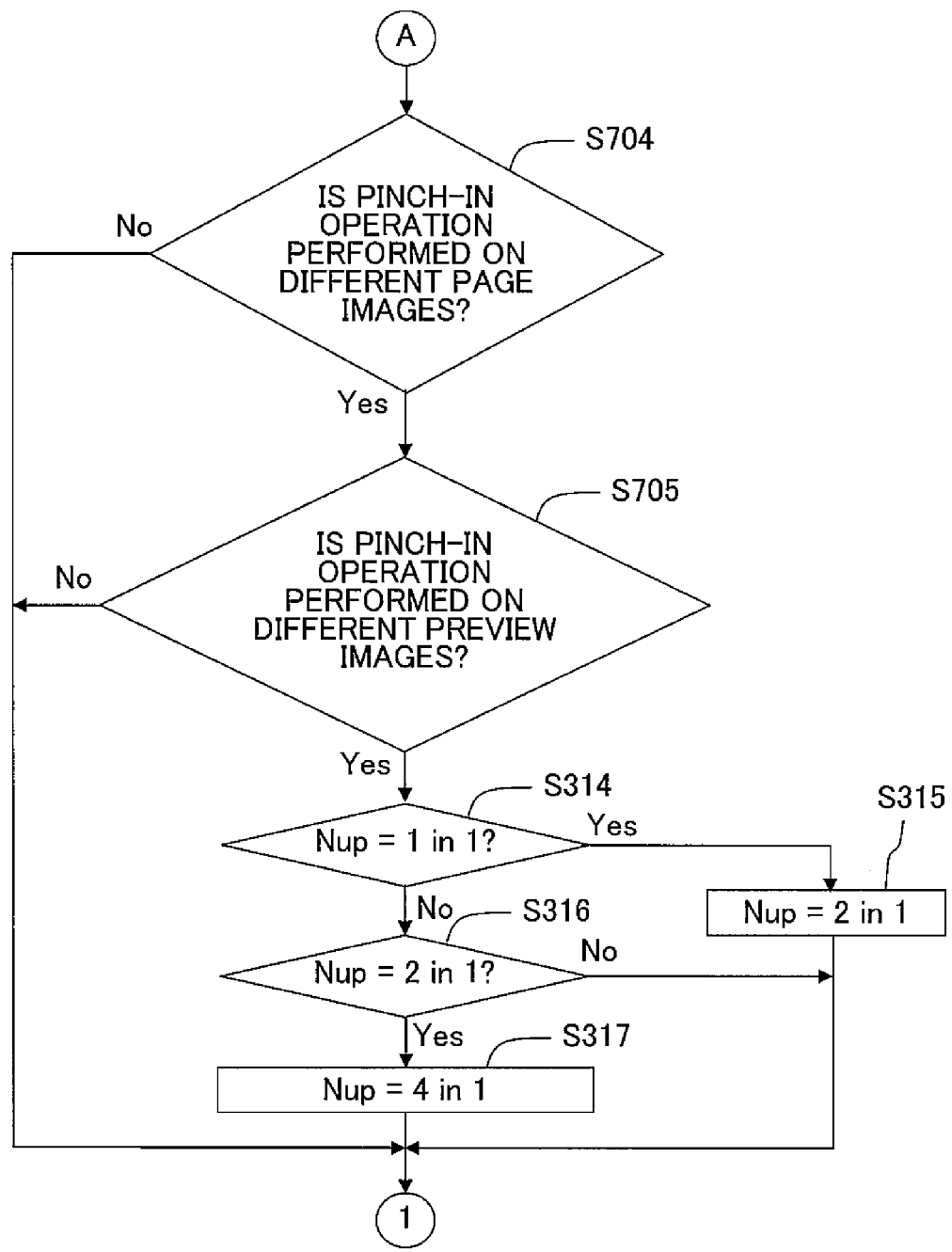
Figure 8A:
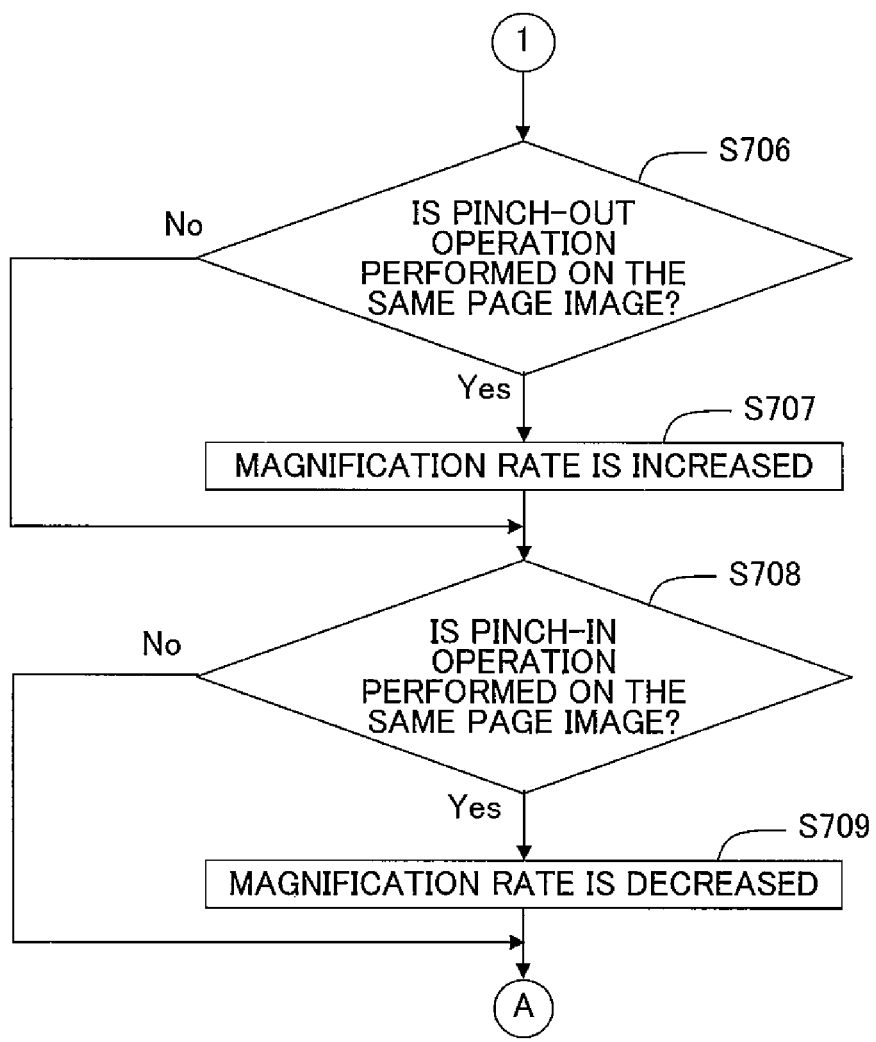

FIGS. 7A, 7B and FIG. 8 are flowcharts each showing the main process of the second embodiment. Similar to the first embodiment, this main process is also executed by the CPU 11 in accordance with the print control app 12b, and is started when the selection of to-be printed image is determined by the user. In the following description, each image included in the preview image 60 is referred to as "page image" in some cases. At first, the CPU 11 performs the process including S301 to S304. In this embodiment, in S301, the CPU 11 stores the print setting 12c, the value of the layout information, and the initial value of the magnification-ratio in the print setting memory 13a, the layout information memory 13b, and the magnification-ratio memory 13c, respectively, and further stores "0 degree" as an initial value of information indicating a rotation angle of each of the obtained images (hereinafter referred to as "rotation information of page image") in a predetermined area of the RAM 13. Further, in S301, the CPU 11 stores information indicating that all of the printing pages (preview images 60 of all the pages) are arranged to be portrait-oriented, in the predetermined area of the RAM 13, as an initial value of information indicating the orientation of the print paper (hereinafter referred to as "rotation information of paper sheet"). Furthermore, the CPU 11 performs the layout process in S303 based on the information stored in each of the memories 13a to 13c, the rotation information of page image stored in the RAM 13, and the rotation information of paper sheet stored in the RAM 13.

In a case that the CPU 11 judges that it is performed the pinch-out operation, in which two points detected on different page images are used as the base points, instead of the operation of the completion button 55 (S305: No, S702: Yes), the CPU 11 judges whether or not the pinch-out operation is performed so that two points detected on the same preview image 60 are used as the base points (S703). In a case that the CPU 11 judges in S703 that the pinch-out operation is performed so that two points detected on the same preview image 60 are used as the base points (S703: Yes), the CPU 11 executes the process including S308 to S311 similar to the first embodiment, and the process proceeds to S704. An example of change in display of the preview screen 150 based on the processes of S702, S703, and S308 to S311 is as shown in FIG. 5B.

In a case that it is not performed the pinch-out operation in which two points detected on different page images are used as the base points (S702: No) or that the two points are detected on different page images but are not detected on the same preview image 60 in the pinch-out operation (S703: No), the CPU 11 judges whether or not it is performed the pinch-in operation in which two points detected on difference page images are used as the base points (S704). In a case that the CPU 11 judges that it is performed the pinch-in operation in which two points detected on different page images are used as the base points (S704: Yes), the CPU 11 judges whether or not the pinch-in operation is performed so that two points detected on different preview images 60 are used as the base points (S705). In a case that the CPU 11 judges that the pinch-in operation is performed so that two points detected on different preview images 60 are used as the base points (S705: Yes), the CPU 11 executes the process including S314 to S317 similar to the first embodiment and the process proceeds to S706 (see FIG. 8). An example of change in display of the preview screen 150 based on the processes of S704, S705, and S314 to S317 is as shown in FIG. 5A.

In a case that it is not performed the pinch-in operation in which two points detected on different page images are used as the base points (S704: No) or that the two points are detected on different page images but are not detected on different preview images 60 in the pinch-in operation (S705: No), the CPU 11 judges whether or not it is performed the pinch-out operation in which two points detected on the same page image are used as the base points (S706). In a case that the CPU 11 judges that it is performed the pinch-out operation in which two points detected on the same page image are used as the base points (S706: Yes), the CPU 11 increases the magnification-ratio currently stored in the magnification-ratio memory 13c depending on the operation amount of the pinch-out operation (S707). Then, in a case that the CPU 11 executes the process of S304 subsequently, for example, the display of the preview screen 150e in FIG. 4 is changed to the display of the preview screen 150b. Meanwhile, in a case that the CPU 11 judges that it is performed the pinch-in operation in which two points detected on the same page image are used as the base points (S706: No, S708: Yes), the CPU 11 decreases the magnification-ratio currently stored in the magnification-ratio memory 13c depending on the operation amount of the pinch-in operation (S709). Then, in the case that the CPU 11 executes the process of S304 subsequently, for example, the display of the preview screen 150b in FIG. 4 is changed to the display of the preview screen 150e.

In a case that neither the pinch-out operation in which two points detected on the same page image are used as the base points nor the pinch-in operation in which two points detected on the same page image are used as the base points is performed (S708: No), the CPU 11 judges whether or not two points detected on different page images are rotated in the clockwise direction or the counterclockwise direction (S710). In a case that the CPU 11 judges that the two points are rotated in any of the directions (S710: Yes), the CPU 11 judges whether or not the two points are positioned in the same preview image 60 (S711). In a case that the CPU 11 judges that the two points are positioned in the same preview image 60 (S711: Yes), the CPU 11 updates the rotation information of paper sheet corresponding to the preview image 60 in which the two points are detected and the rotation information of each image (page image) included in the preview image 60 depending on the rotation direction of the two points (S712). For example, in a case that the detected two points are rotated in the counterclockwise direction, the rotation information of paper sheet corresponding to the preview image 60 in which the two points are positioned is updated to information indicating that the paper sheet of the page corresponding to the preview image 60 is rotated by 90 degrees from the current arrangement state, and further the rotation information of page image corresponding to each image included in the preview image 60 is updated to information indicating that each page image is rotated by 90 degrees from the current arrangement state in the counterclockwise direction as the rotation direction. By performing the process of S712, in the case that the CPU 11 executes the process of S304 subsequently, for example, the display of the preview screen 150f3 in FIG. 6B is changed to the display of the preview screen 150f4.

In a case that two points detected on different page images are not rotated in any of the directions (S710: No) or that two points detected on different page images which are not positioned in the same preview image 60 are rotated in the clockwise direction or the counterclockwise direction (S711: No), the CPU 11 judges whether or not two points detected on the same page image are rotated in the clockwise direction or the counterclockwise direction (S713). In a case that the CPU 11 judges that the two points detected on the same page image are rotated in any of the directions (S713: Yes), the CPU 11 updates the rotation information of page image in which the two points are detected depending on the rotation direction of the two points (S714) and then the process proceeds to S303. For example, in a case that the detected two points are rotated in the counterclockwise direction, the rotation information of page image in which the two points are positioned is updated to information indicating that the page image is rotated by 90 degrees from the current arrangement state in the counterclockwise direction as the rotation direction. By performing the process of S714, in the case that the CPU 11 executes the process of S304 subsequently, for example, the display of the preview screen 150f1 in FIG. 6A is changed to the display of the preview screen 150f2.

In the case that two points detected on the same page image are not rotated in any of the directions (S713: No), the process proceeds to S303 by the CPU 11. In a case that the CPU 11 judges that the completion button 55 is operated (S305: Yes), the CPU 11 transmits, as printing data, the image data of to-be printed image, the contents of the print setting memory 13a and the layout information memory 13b, and the rotation information of page image and the rotation information of paper sheet which are stored in RAM 13 to the printer 30 (S322), and then the main process is completed. Accordingly, when the printing is performed, the value of N changed by the pinching-operation, the orientation of the page image, and the orientation of the print paper, the orientations each being changed by the rotation operation of two points detected by the touch panel 17, are reflected.

As described above, according to the present teaching, the user is capable of easily determining a value of N that the user wants while confirming the preview image 60 displayed on the preview screen 50, which is convenient. Further, the value of N changed, etc., can be reflected in the printing, and thus the operability at the time of changing the printing layout is superior.

In the above embodiments, the print control app 12b is an example of an image processing program. The portable terminal 10 is an example of an image processing apparatus. The LCD 16 is an example of a display section. The touch panel 17 is an example of a touch panel. The CPU 11 is an example of a controller. The paper object 61 is an example of a rectangular area. The preview image 60 is an example of a print preview image. Each of the arrangement areas 61a to 61d is an example of an arrangement area. The RAM 13 is an example of a storage section. The CPU 11 performing the process of S302 is an example of an image obtaining mechanism and an image obtaining step. The CPU 11 performing the processes of S303 and S304 is an example of a display control mechanism. The CPU 11 performing the processes of S306, S312, S702, S703, S704, and S705 is an example of an operation judgment mechanism. The CPU 11 performing the processes of S308 to S311 and S314 to S317 is an example of a change mechanism and a print setting change mechanism. The CPU 11 performing the processes of S706 and S708 is an example of a second operation judgment mechanism. The CPU 11 performing the processes of S710 and S713 is an example of a third operation judgment mechanism and an operation judgment mechanism.

Although the present teaching has been described based on the embodiments described above, the present teaching is not restricted to the above embodiments, and it is readily inferable that various modifications without departing from the scope of the present teaching are possible.

For instance, in each of the embodiments, the print control app 12b is installed in the portable terminal 10. However, the image processing apparatus in which the print control app 12b is installed is not limited to the portable terminal 10 exemplified in the embodiments. It is also possible to adopt an information processing apparatus such as a personal computer, a tablet terminal, and a digital camera. In the above embodiments, although the portable terminal 10 is exemplified by a portable terminal having a voice communication function, a portable terminal having no voice communication function can be adopted. In the above embodiments, the LCD 16 on which the preview screens 50 and 150 can be displayed is provided in the portable terminal 10 as the image processing apparatus. However, the display device such as the LCD on which the preview screens 50 and 150 can be displayed may be provided independently of the image processing apparatus. In the above embodiments, although the OS 12a installed in the portable terminal 10 is exemplified by Android (trade name), other operation systems can be utilized. In the above embodiments, the preview image has a rectangular shape, However, the preview image can have arbitrary shape, such as a circular shape, ellipse shape, and the like.

In the second embodiment, the display size of the preview image 60 is changed in the case that it is performed the pinching-operation in which two points detected by the touch panel 17 are used as the base points and that the two points are positioned in one page image. However, the size of one page image in which two points are positioned may be magnified or reduced so that the one page image can be arranged in an arrangement area of N-in-1 in which the one page image is currently arranged. According to this modified embodiment, the user is capable of selectively magnifying or reducing one image that the user wants. Further, the change of the display size of the page image may be performed by an operation other than the pinching-operation, such as an operation by using the minus button 53 or the plus button 54 and an operation by using a reduction button or a magnification button included in the operation key 15. Further, in a case that two points are positioned in an arrangement area in which one page image is arranged, even when at least one of the two points is positioned at a position deviated from the one page image, the display size of the preview image 60 may be changed in accordance with the pinching-operation using the two points as the base points similar to the second embodiment. Further, in the second embodiment, the display size of the preview image 60 is magnified or reduced depending on the operation amount in one pinching-operation. However, the display size of the preview image 60 may be magnified or reduced at a predetermined percentage for each one pinching-operation.

In the second embodiment, the value of N is changed in the case that it is performed the pinching-operation in which two points detected by the touch panel 17 are used as the base points and that the two points are positioned in two page images respectively. However, in a case that the display size of the page image is changed by an operation other than the pinching-operation, the present teaching is not limited to that the two points are positioned in the two page images respectively. For example, on the condition that two points are detected by the touch panel 17 and in a case that it is performed the pinch-in operation in which the two points are used as the base points, the value of N may be allowed to be one level lower similar to the second embodiment. Meanwhile, on the condition that two points are detected by the touch panel 17 and in a case that it is performed the pinch-out operation in which the two points are used as the base points, the value of N is allow to be one level higher similar to the second embodiment.

In the second embodiment, the value of N is made to be one level higher or one level lower in one pinching-operation. However, the amount of change in the value of N for one pinching-operation may vary depending on positions of two points detected by the touch panel 17. For instance, in the state that the preview screen 150d shown on the left side of FIG. 5A is displayed and in a case that it is performed the pinch-in operation in which two points T1 and T2 are used as the base points, on the assumption that the point T1 is positioned in the preview image 60 of the third image disposed at the lower left side and the point T2 is positioned in the preview image 60 of the second page disposed at the upper right side, the preview image 60 of 4-in-1 may be displayed. In other words, the value of N may be changed so that images included in respective preview images 60, which are positioned between the points T1 and T2 in left and right directions and up and down directions, are included in one preview image 60. Meanwhile, in a case that it is performed the pinch-out operation in which two points respectively positioned in two page images, which are included in the same print preview image, are used as the base points, the current value of N may be changed to a value of N based on the number of images which are included in the preview image 60 and are positioned between the points T1 and T2 in the left and right directions and the up and down directions. Or, in the second embodiment, the value of N may be changed by the amount of change depending on the operation amount of the pinching-operation similar to the first embodiment.

In the above embodiments, in the case that the pinch-in operation is performed, the value of N increases; and in the case that the pinch-out operation is performed, the value of N decreases. However, the following configuration is also allowable. That is, in the case that the pinch-in operation is performed, the value of N may decrease and in the case that the pinch-out operation is performed, the value of N may increase. In the second embodiment, the value of N increases on the condition that it is performed the pinch-in operation in which two points positioned in two page images included in different preview images 60 are used as the base points. However, the value of N may increase on the condition that it is performed the pinch-in operation in which two points positioned in two page images included in the same preview image 60 are used as the base points. Similarly, in the second embodiment, the value of N decreases on the condition that it is performed the pinch-out operation in which two points positioned in two page images included in the same preview image 60 are used as the base points. However, the value of N may decrease on the condition that it is performed the pinch-out operation in which two points positioned in two page images in different preview images 60 are used as the base points.

In the second embodiment, in the case that two points detected by the touch panel 17 are rotated in the clockwise or counterclockwise direction and that the two points are positioned in one page image, the one page image is rotated. However, the page image may be rotated by an operation other than this rotation operation. For example, in a case that a tap operation is performed for one page image, the one page image may be rotated by a predetermined angle. Or, in a case that the user touches one page image to perform a slight drag operation in a predetermined direction as it is, the one page image may be rotated by a rotation angle determined depending on the direction of the drag operation. Alternatively, in a case that two points detected by the touch panel 17 are positioned in one page image and that one of the two points is rotated in the clockwise or counterclockwise direction with the other of the two points as a rotation center, the one page image may be rotated. Alternatively, in a case that two points are positioned in an arrangement area in which one page image to be rotated is arranged, even when at least one of the two points is positioned at a position which is deviated from the one page image, the page image may be rotated with the rotation operation of the two points in a similar manner as the second embodiment.

In the second embodiment, in the case that two points detected by the touch panel 17 are rotated in the clockwise or counterclockwise direction, the page image or the preview image 60 is rotated by 90 degrees in a direction corresponding to the rotation direction of the two points. However, it is possible to adopt various values, as the rotation angle of the page image or the preview image 60 in one rotation operation, in addition to "90 degrees in the direction corresponding to the rotation direction of the two points". For example, the page image or the preview image 60 may be rotated by 270 degrees, for one rotation operation, in a direction opposite to the direction corresponding to the rotation direction of the two points or may be rotated by 180 degrees for one rotation operation. Or, the rotation angle of the page image or the preview image 60 may be changed depending on the rotation amount of when the two points are rotated. Alternatively, in a case that one of the two points detected by the touch panel 17 is not moved and that the other of the two points is rotated in the clockwise or counterclockwise direction, the page image or the preview image 60 may be rotated in a similar manner as the second embodiment.

In the second embodiment, in the case that two points detected by the touch panel 17 are rotated in the clockwise or counterclockwise direction and that the two points are positioned in two page images included in one preview image 60, the one preview image 60 is rotated. However, in the case that two points detected by the touch panel 17 are positioned in one preview image 60, even when at least one of the two points is positioned in an area outside the one page image such as a margin, the preview image 60 may be rotated in accordance with the rotation of the two points in the clockwise or counterclockwise direction in a similar manner to the second embodiment. Alternatively, in the case that two points detected by the touch panel 17 are rotated in the clockwise or counterclockwise direction and that the two points are positioned in two preview images 60 respectively, the two preview images 60 may be rotated.

In the second embodiment, as shown in FIG. 6B, the paper object 61 of the preview image 60 to be rotated and each image included in the preview image 60 are rotated in accordance with the rotation operation of the two points. Instead of this configuration, only the paper object 61 may be rotated in accordance with the rotation operation of the two points in a state that the orientation of each image included in the preview image 60 to be rotated is maintained. According to this configuration, in a case that each arrangement area provided in the preview image 60 to be rotated is vertically long and that each page image is horizontally long, the horizontally long page image can be arranged in the horizontally long arrangement area by rotating the paper object 61. Accordingly, each of the horizontally long page images can be arranged to have a size as large as possible to improve visibility of each of the layout page images. Also in this modified embodiment, similar to the second embodiment, it is preferable that the arrangement order of the page images arranged in the preview image 60 is not changed before and after the rotation of the preview image 60. Or, the following configuration is also allowable. That is, the orientation of the portable terminal 10 is measured by an acceleration sensor etc., and the orientation of the paper object 61 is changed depending on the orientation of the portable terminal 10 in a state that the orientation of the page image is maintained.

What is claimed is:

1. A non-transitory computer-readable medium storing an image processing program executable by a controller of an image processing apparatus configured to be communicatable with a display section on which a touch panel is overlaid, the touch panel being configured to simultaneously detect contact of two points by two input media, the image processing program being configured to cause the controller to execute:

obtaining a plurality of image data;

allowing the display section to display one print preview image in a particular area wherein N images of a plurality of images based on the plurality of the obtained image data is arranged in the particular area, wherein N is an integer of not less than 1;

judging whether either (a) or (b) is detected in a state that the at least one print preview image is displayed on the display section:

(a) two points contacting the touch panel move away from each other;

(b) two points contacting the touch panel approach toward each other;

judging whether one of the two points contacts one of the N images and the other of the two points contacts another one of the N images in a case that is judged that either (a) or (b) is detected, and changing the value of N which has been set in the at least one print preview image currently displayed on the display section, in a case that it is judged that one of the two points contacts one of the N images and the other of the two points contacts another one of the N images, wherein, in a case that the at least one print preview image has been displayed on the display section and that the value of N is changed, the display section is allowed to display a print preview image, instead of the at least one print preview image currently displayed on the display section, the print preview image being obtained by arranging at least one image of not more than the value of N changed by the controller, among the plurality of images based on the plurality of the obtained image data, in the particular area depending on the value of N changed by the controller, wherein the image processing program is configured to cause the controller to:

judge, in a case that the plurality of images based on the plurality of the obtained image data have been displayed on the display section as the images included in the at least one print preview image and that a approach or contact of two points positioned in one image among the plurality of images displayed on the display section, is detected by the touch panel, whether the two points move away from each other or approach toward each other; and without changing the value of N, allow the display section to display a print preview image obtained by magnifying or reducing the at least one print preview image currently displayed on the display section, instead of the at least one print preview image currently displayed on the display screen, in the case that it is judged that the two points move away from each other or approach toward each other.

2. The computer-readable medium according to claim 1, wherein the image processing program is configured to cause the controller to:

decrease the value of N in a case that it is judged that the two points move away from each other; and increase the value of N in a case that it is judged that the two points approach toward each other.

3. The computer-readable medium according to claim 2, wherein the image processing program is configured to cause the controller to:

make the value of N smaller as a displacement amount of the two points moving away from each other is greater, in the case that it is judged that the two points move away from each other; and make the value of N greater as a displacement amount of the two points approaching toward each other is greater, in the case that it is judged that the two points approach toward each other.

4. The computer-readable medium according to claim 1, wherein the image processing program is configured to cause the controller to increase the value of N, in a case that it is judged that the two points approach toward each other and that the two points contacting the touch panel is detected by the touch panel are positioned in different print preview images.

5. The computer-readable medium according to claim 1, wherein the image processing program is configured to cause the controller to decrease the value of N, in a case that it is judged that the two points move away from each other and that the two points contacting the touch panel is detected by the touch panel are positioned in the same print preview image.

6. The computer-readable medium according to claim 1, wherein the image processing program is configured to cause the controller to change the value of N by one level, the value of N being provided to have a plurality of levels, in the case that it is judged that the two points move away from each other or approach toward each other.

7. The computer-readable medium according to claim 1, wherein the image processing program is configured to cause the controller to:

judge, in a case that the plurality of images based on the plurality of the obtained image data have been displayed on the display section as the images included in the at least one print preview image and that contact of two points positioned in one image, among the plurality of images displayed on the display section, is detected by the touch panel, whether the two points move away from each other or approach toward each other; and allow the display section to display a print preview image, in the case that it is judged that the two points move away from each other or approach toward each other, instead of the at least one print preview image currently displayed on the display section and including the one image, the print preview image being obtained by magnifying or reducing the one image within an image arrangement area, which is set in the particular area depending on the value of N, while a size of at least one image, other than the one image, included in the at least one print preview image currently displayed is maintained.

8. The computer-readable medium according to claim 1, wherein the image processing program is configured to cause the controller to:

judge, in a case that the at least one print preview image has been displayed on the display section and that approach or contact of two points is detected by the touch panel, whether at least one of the two points moves in a predetermined rotation direction;

judge whether both of the two points are detected by the touch panel on same image;

allow the display section to display a print preview image, in a case that it is judged that the at least one point moves in the predetermined rotation direction and that the two points contacting the touch panel are detected on the same image, instead of the at least one print preview image currently displayed on the display section and including the one image, the print preview image being obtained by rotating the one image by a predetermined angle while a display of at least one image, other than the one image, included in the at least one print preview image currently displayed is maintained; and allow the display section to display a print preview image, in the case that it is judged that the at least one point moves in the predetermined rotation direction, that the two points, at which contacting the touch panel is detected by the touch panel, are positioned in the at least one print preview image, and that contacting the touch panel at the two points are not detected on the same image included in the at least one print preview image at the same time, instead of the at least one print preview image currently displayed on the display section and in which the two points are detected, the print preview image being obtained by rotating the particular area of the at least one print preview image and each image included in the at least one print preview image in which the two points are detected, by a predetermined angle, while a display of at least one print preview image, which is currently displayed on the display section and is other than the at least one print preview image in which the two points are detected, is maintained.

9. The computer-readable medium according to claim 1, wherein the image processing program is configured to cause the controller to:

judge, in a case that the at least one print preview image has been displayed on the display section and that contact of two points is detected by the touch panel, whether at least one of the two points moves in a predetermined rotation direction;

allow the display section to display a print preview image, in a case that it is judged that the at least one point moves in the predetermined rotation direction and that the two points, contacting the touch panel are detected on the same, instead of the at least one print preview image currently displayed on the display section and including the one image, the print preview image being obtained by rotating the one image by a predetermined angle while a display of at least one image, other than the one image, included in the at least one print preview image currently displayed is maintained; and allow the display section to display a print preview image, in the case that it is judged that the at least one point moves in the predetermined rotation direction, that the two points, at which contacting the touch panel are detected by the touch panel, are positioned in the at least one print preview image, and that the two points contacting the touch panel are not detected on the same image, instead of the at least one print preview image currently displayed on the display section and in which the two points are detected, the print preview image being obtained by rotating the particular area of the at least one print preview image by a predetermined angle, while a display of at least one print preview image, which is currently displayed on the display section and is other than the at least one print preview image in which the two points are detected, and an orientation of each image included in the at least one print preview image in which the two points are detected are maintained.

10. The computer-readable medium according to claim 1, wherein in a case that the value of N is an integer of not less than 2, the particular area is formed of a plurality of arrangement areas configured to be divided depending on the value of N; and the image processing program is configured to cause the controller to:

allow the display section to display, in the case that the value of N is the integer of not less than 2, a print preview image obtained by arranging the images based on the plurality of image data obtained in the arrangement areas forming the particular area respectively, in accordance with an arrangement order allocated based on a position of each of the arrangement areas according to a predetermined rule; and allow the display section to display a print preview image, in the case that it is judged that the at least one point moves in the predetermined rotation direction, that the two points, at which contacting the touch panel are detected by the touch panel, are positioned in the at least one print preview image, and that the two points contacting the touch panel are not detected on the same image, instead of the at least one print preview image currently displayed on the display section and in which the two points are detected, the print preview image being obtained by rotating the particular area of the at least one print preview image in which the two points are detected by a predetermined angle and arranging the images in the arrangement areas forming the particular area rotated by the predetermined angle, in accordance with an arrangement order allocated based on a position of each of the arrangement areas forming the particular area rotated by the predetermined angle, according to the predetermined rule which is the same as that before the rotation.

11. The computer-readable medium according to claim 1, wherein the image processing program is configured to cause the controller to change, in the case that it is judged that the two points move away from each other or approach toward each other and that the value of N is changed based on the judgment, information in relation to a print layout, of print setting information which is stored in a storage section and is used at the time of printing, depending on a value of N changed by the controller.

12. A non-transitory computer-readable medium storing an image processing program executable by a controller of an image processing apparatus configured to be communicatable with a display section on which a touch panel is overlaid, the touch panel being configured to simultaneously detect contact of two points by two input media, the image processing program being configured to cause the controller to:

obtain a plurality of image data;

allow the display section to display at least one print preview image in which at least one image of not more than N among a plurality of images based on the plurality of the obtained image data is arranged in a particular area corresponding to a print area, wherein N is an integer of not less than 1;

judge, in a case that the contact of two points is detected by the touch panel in a state that the at least one print preview image is displayed on the display section, whether at least one of the two points detected by the touch panel moves in a predetermined rotation direction;

judge whether both of the two points are detected by the touch panel on same image;

allow the display section to display a print preview image, in a case that it is judged that the at least one point moves in the predetermined rotation direction and that the two points contacting the touch panel are detected on the same image, instead of the at least one print preview image currently displayed on the display section and including the one image, the print preview image being obtained by rotating the one image by a predetermined angle while a display of at least one image, other than the one image, included in the at least one print preview image currently displayed is maintained; and allow the display section to display a print preview image, in the case that it is judged that the at least one point moves in the predetermined rotation direction, that the two points, at which contacting the touch panel is detected by the touch panel, are positioned in the at least one print preview image, and that the two points contacting the touch panel are not detected on the same image, instead of the at least one print preview image currently displayed on the display section and in which the two points are detected, the print preview image being obtained by rotating the particular area of the at least one print preview image and each image included in the at least one print preview image, in which the two points are detected, by a predetermined angle, while a display of at least one print preview image, which is currently displayed on the display section and is other than the at least one print preview image in which the two points are detected, is maintained.

13. An image processing apparatus configured to process an image, comprising:

a display section;

a touch panel which is overlaid on the display section and configured to simultaneously detect contact of two points by two input media; and a controller configured to execute:

obtaining a plurality of image data;

allowing the display section to display at least one print preview image in which at least one image of not more than N among a plurality of images based on the plurality of the obtained image data, is arranged in a particular area corresponding to a print area depending on a value of N, wherein N is an integer of not less than 1;

judging whether two points at which contacting the touch panel is detected by the touch panel move away from each other or approach toward each other in a state that the at least one print preview image is displayed on the display section;

judging, in a case that the at least one print preview image has been displayed on the display section and that approach or contact of two points is detected by the touch panel, whether at least one of the two points moves in a predetermined rotation direction;

judging whether both of the two points are detected by the touch panel on same image; and changing the value of N which has been set in the at least one print preview image currently displayed on the display section, in a case that it is judged that the two points move away from each other or approach toward each other, allowing the display section to display a print preview image, in a case that the value of N is changed, instead of the at least one print preview image currently displayed on the display section, the print preview image being obtained by arranging, at least one image of not more than the value of N changed by the controller, among the plurality of images based on the plurality of image data obtained, in the particular area depending on the value of N changed by the controller;

allowing the display section to display a print preview image, in a case that it is judged that the at least one point moves in the predetermined rotation direction and that the two points contacting the touch panel are detected on the same image, instead of the at least one print preview image currently displayed on the display section and including the one image, the print preview image being obtained by rotating the one image by a predetermined angle while a display of at least one image, other than the one image, included in the at least one print preview image currently displayed is maintained; and allowing the display section to display a print preview image, in the case that it is judged that the at least one point moves in the predetermined rotation direction, that the two points, at which contacting the touch panel is detected by the touch panel, are positioned in the at least one print review image, and that the two points contacting the touch panel are not detected on the same image, instead of the at least one print preview image currently displayed on the display section and in which the two points are detected, the print preview image being obtained by rotating the particular area of the at least one print preview image and each image included in the at least one print preview image, in which the two points are detected, by a predetermined angle, while a display of at least one print preview image, which is currently displayed on the display section and is other than the at least one print preview image in which the two points are detected, is maintained.

14. An image processing method executed by an image processing apparatus provided with a display section and a touch panel, which is overlaid on the display section and configured to simultaneously detect contact of two points by two input media;

the image processing method comprising:

obtaining a plurality of image data;

allowing the display section to display at least one print preview image in which at least one image of not more than N among a plurality of images based on the plurality of image data obtained, is arranged in a particular area corresponding to a print area depending on a value of N, wherein N is an integer of not less than 1;

judging whether two points at which contacting the touch panel is detected by the touch panel move away from each other or approach toward each other in a state that the at least one print preview image is displayed on the display section;

judging, in a case that the at least one print preview image has been displayed on the display section and that approach or contact of two points is detected by the touch panel, whether at least one of the two points moves in a predetermined rotation direction;

judging whether both of the two points are detected by the touch panel on same image; and changing the value of N which has been set in the at least one print preview image currently displayed on the display section, in a case that it is judged that the two points move away from each other or approach toward each other, wherein, in a case that the at least one print preview image has been displayed on the display section and that the value of N is changed, the display section is allowed to display a print preview image, instead of the at least one print preview image currently displayed on the display section, the print preview image being obtained by arranging at least one image of not more than the value of N changed by the controller, among the plurality of images based on the plurality of the obtained image data, in the particular area depending on the value of N changed by the controller;

wherein, in a case that it is judged that the at least one point moves in the predetermined rotation direction and that the two points contacting the touch panel are detected on the same image, instead of the at least one print preview image currently displayed on the display section and including the one image, the display section is allowed to display a print preview image, the print preview image being obtained by rotating the one image by a predetermined angle while a display of at least one image, other than the one image, included in the at least one print preview image currently displayed is maintained; and wherein, in the case that it is judged that the at least one point moves in the predetermined rotation direction, that the two points, at which contacting the touch panel is detected by the touch panel, are positioned in the at least one print preview image, and that the two points contacting the touch panel are not detected on the same image, instead of the at least one print preview image currently displayed on the display section and in which the two points are detected, the display section is allowed to display a print preview image, the print preview image being obtained by rotating the particular area of the at least one print preview image and each image included in the at least one print preview image, in which the two points are detected, by a predetermined angle, while a display of at least one print preview image, which is currently displayed on the display section and is other than the at least one print preview image in which the two points are detected, is maintained.

15. The computer-readable medium according to claim 12, wherein the image processing program is configured to cause the controller to:

allow the display section to display a print preview image, in the case that it is judged that the at least one point moves in the predetermined rotation direction, that the two points, at which contacting the touch panel are detected by the touch panel, are positioned in the at least one print preview image, and that the two points contacting the touch panel are not detected on the same image, instead of the at least one print preview image currently displayed on the display section and in which the two points are detected, the print preview image being obtained by rotating the particular area of the at least one print preview image by a predetermined angle, while a display of at least one print preview image, which is currently displayed on the display section and is other than the at least one print preview image in which the two points are detected, and an orientation of each image included in the at least one print preview image in which the two points are detected are maintained.

16. The computer-readable medium according to claim 12, wherein in a case that the value of N is an integer of not less than 2, the particular area is formed of a plurality of arrangement areas configured to be divided depending on the value of N; and the image processing program is configured to cause the controller to:

allow the display section to display, in the case that the value of N is the integer of not less than 2, a print preview image obtained by arranging the images based on the plurality of image data obtained in the arrangement areas forming the particular area respectively, in accordance with an arrangement order allocated based on a position of each of the arrangement areas according to a predetermined rule; and allow the display section to display a print preview image, in the case that it is judged that the at least one point moves in the predetermined rotation direction, that the two points, at which contacting the touch panel are detected by the touch panel, are positioned in the at least one print preview image, and that the two points contacting the touch panel are not detected on the same image, instead of the at least one print preview image currently displayed on the display section and in which the two points are detected, the print preview image being obtained by rotating the particular area of the at least one print preview image in which the two points are detected by a predetermined angle and arranging the images in the arrangement areas forming the particular area rotated by the predetermined angle, in accordance with an arrangement order allocated based on a position of each of the arrangement areas forming the particular area rotated by the predetermined angle, according to the predetermined rule which is the same as that before the rotation.

17. The computer-readable medium according to claim 12, wherein the image processing program is configured to cause the controller to change the value of N which has been set in the at least one print preview image currently displayed on the display section, in a case that it is judged that one of the two points contacts one of the N images and the other of the two points contacts another one of the N images, wherein, in a case that the at least one print preview image has been displayed on the display section and that the value of N is changed, the display section is allowed to display a print preview image, instead of the at least one print preview image currently displayed on the display section, the print preview image being obtained by arranging at least one image of not more than the value of N changed by the controller, among the plurality of images based on the plurality of the obtained image data, in the particular area depending on the value of N changed by the controller.

18. The computer-readable medium according to claim 17, wherein the image processing program is configured to cause the controller to:

judge, in a case that the plurality of images based on the plurality of the obtained image data have been displayed on the display section as the images included in the at least one print preview image and that approach or contact of two points positioned in one image, among the plurality of images displayed on the display section, is detected by the touch panel, whether the two points move away from each other or approach toward each other; and without changing the value of N, allow the display section to display a print preview image obtained by magnifying or reducing the at least one print preview image currently displayed on the display section, instead of the at least one print preview image currently displayed on the display screen, in the case that it is judged that the two points move away from each other or approach toward each other.

\* \* \* \* \*